(12) United States Patent (10) Patent No.: US 12,490,624 B2
Kim et al. (45) Date of Patent: Dec. 2, 2025

(54) OLED DISPLAY DEVICE FEATURING AN ANTENNA STRUCTURE COMPOSED OF A SUBSTRATE INTEGRATED WAVE GUIDE FORMED IN A DIELECTRIC LAYER BY A PLURALITY OF THROUGH-HOLES

(71) Applicants: Samsung Display Co., Ltd., Yongin-Si (KR); UNIST(ULSAN NATIONAL INSTITUTE OF SCIENCE AND TECHNOLOGY), Ulsan (KR)

(72) Inventors: Kiseo Kim, Yongin-si (KR); Gangil Byun, Ulsan (KR); Eunjin Sung, Yongin-si (KR); Sangrock Yoon, Hwaseong-si (KR); Seungwook Chun, Daegu (KR); Jinmyeong Heo, Ulsan (KR)

(73) Assignees: Samsung Display Co., Ltd., Yongin-Si (KR); INIST (ULSAN NATIONAL INSTITUT OF SCIENCE AND TECHNOLOGY), Ulsan (KR)

( * ) Notice: Subject to any disclaimer, the term of this patent is extended or adjusted under 35 U.S.C. 154(b) by 654 days.

(21) Appl. No.: 17/902,472

(22) Filed: Sep. 2, 2022

(65) Prior Publication Data

US 2023/0180573 A1 Jun. 8, 2023

(51) Int. Cl.
*H10K 59/40* (2023.01)
*G06F 3/041* (2006.01)
(Continued)

(52) U.S. Cl.
CPC .......... *H10K 59/40* (2023.02); *G06F 3/0412* (2013.01); *H01Q 1/243* (2013.01); *H01Q 13/10* (2013.01);
(Continued)

(58) Field of Classification Search
CPC .......... H10K 59/40; G04F 2203/04103; H01Q 1/243; H01Q 13/10; G06F 1/1698; H04M 2250/22

See application file for complete search history.

(56) References Cited

U.S. PATENT DOCUMENTS 11,594,818 B2 2/2023 Park et al.
2020/0227807 A1 7/2020 Kirino
(Continued)

FOREIGN PATENT DOCUMENTS

CN 111725605 A 9/2020
JP 2020-113988 A 7/2020
(Continued)

OTHER PUBLICATIONS

Int J RF and Microwave CAE 26:129-145 (Year: 2016).*
(Continued)

*Primary Examiner* — Davienne N Monbleau
*Assistant Examiner* — Dmitri Mihaliov
(74) *Attorney, Agent, or Firm* — Innovation Counsel LLP

(57) ABSTRACT

Provided is an electronic device including a display layer on which an active region and a peripheral region adjacent to the active region are defined, and which includes a base layer, a sensor layer disposed on the display layer, including a plurality of sensing electrodes, and having a plurality of first slots defined thereon, and a lower member layer disposed below the display layer, wherein a plurality of first through-holes are defined in the base layer and the lower member layer, and when, viewed on a plane, the plurality of first through-holes are spaced apart from each other with respect to the plurality of first slots interposed therebetween.

20 Claims, 16 Drawing Sheets

(51) Int. Cl.
  *G06F 3/044*    (2006.01)
  *H01Q 1/24*     (2006.01)
  *H01Q 13/10*    (2006.01)
  *H10K 50/87*    (2023.01)
  *H10K 59/12*    (2023.01)

(52) U.S. Cl.
  CPC .......... *G06F 3/0443* (2019.05); *G06F 3/0446* (2019.05); *G06F 2203/04111* (2013.01); *H10K 50/87* (2023.02); *H10K 59/12* (2023.02)

(56) References Cited

U.S. PATENT DOCUMENTS

2021/0104582 A1    4/2021  Kim et al.
2021/0295006 A1*   9/2021  Ryu ...................... G06F 3/0445
2021/0328364 A1   10/2021  Jia

FOREIGN PATENT DOCUMENTS

| KR | 10-2020-0112224 A | 10/2020 | |
| KR | 10-2021-0004754 A | 1/2021 | |
| KR | 10-2021-0041156 A | 4/2021 | |
| KR | 10-2021-0113519 A | 9/2021 | |
| WO | WO-2019088594 A2 * | 5/2019 | ......... H10K 59/8792 |

OTHER PUBLICATIONS

Juhua Liu et al., Substrate Integrated Waveguide (SIW) Leaky-Wave Antenna With Transverse Slots IEEE Transactions on Antennas and Propagation (vol. 60, Issue: 1, Jan. 2012).

\* cited by examiner

OLED DISPLAY DEVICE FEATURING AN ANTENNA STRUCTURE COMPOSED OF A SUBSTRATE INTEGRATED WAVE GUIDE FORMED IN A DIELECTRIC LAYER BY A PLURALITY OF THROUGH-HOLES

CROSS-REFERENCE TO RELATED APPLICATIONS

This U.S. non-provisional patent application claims priority under 35 U.S.C. § 119 of Korean Patent Application No. 10-2021-0172910, filed on Dec. 6, 2021, the entire contents of which are hereby incorporated by reference.

BACKGROUND

The present disclosure generally relates to an electronic device. More particularly, the present disclosure relates to an electronic device capable of improving frequency signal radiation performance.

An electronic device may include electronic modules. For example, the electronic device may be a portable terminal or a wearable device, and the electronic modules may include an antenna module, a camera module, or a battery module. As portable terminals become thinner and wearable devices become smaller, the space in which electronic modules are mounted is gradually reduced. Also, as electronic devices become highly functional and have more advanced specifications, the number of electronic modules included in electronic devices is increasing.

SUMMARY

The present disclosure provides an electronic device with improved frequency signal radiation performance.

An embodiment of the present disclosure provides an electronic device including a display layer on which an active region and a peripheral region adjacent to the active region are defined, and which includes a base layer, a sensor layer disposed on the display layer, including a plurality of sensing electrodes, and having a plurality of first slots defined in the sensor layer, and a lower member layer disposed below the display layer, wherein a plurality of first through-holes are defined in the base layer and the lower member layer, and when viewed on a plane, the plurality of first through-holes are spaced apart from each other with respect to the plurality of first slots interposed therebetween.

In an embodiment, when viewed on a plane, the plurality of first through-holes and the plurality of first slots may overlap the active region.

In an embodiment, a metal may be disposed along a side surface of each of the plurality of first through-holes.

In an embodiment, a cover layer disposed below the lower member layer, and having electrical conductivity may be further included.

In an embodiment, when viewed on a plane, the cover layer may overlap at least some of the plurality of first through-holes and at least some of the plurality of first slots.

In an embodiment, the display layer may further include a common electrode disposed on the base layer, wherein a plurality of second slots respectively overlapping the plurality of first slots may be defined in the common electrode.

In an embodiment, when viewed on a plane, the plurality of first through-holes may overlap the plurality of sensing electrodes.

In an embodiment, when viewed on a plane, the plurality of first through-holes may not overlap the plurality of sensing electrodes.

In an embodiment the display layer may further include a flexible circuit film disposed in the peripheral region.

In an embodiment, the flexible circuit film may face a side surface of the display layer.

In an embodiment, the flexible circuit film may include a first metal layer, a dielectric layer disposed on the first metal layer, and a second metal layer disposed on the dielectric layer, wherein a plurality of second through-holes may be defined in the dielectric layer.

In an embodiment, a plurality of auxiliary slots may be defined in the second metal layer, wherein when viewed on a side surface, the plurality of second through-holes may be spaced apart from each other with respect to the plurality of auxiliary slots interposed therebetween.

In an embodiment, the plurality of first slots may include a plurality of first row slots arranged in a first direction and a plurality of second row slots spaced apart from the plurality of first row slots in a second direction crossing the first direction, and arranged in the first direction.

In an embodiment, the lower member layer may include a protective layer disposed below the base layer, and a heat dissipation sheet disposed below the protective layer.

In an embodiment, the plurality of first slots may be defined in the same layer as a layer on which the plurality of sensing electrodes are disposed.

In an embodiment of the present disclosure, an electronic device includes a display layer in which an active region and a peripheral region adjacent to the active region are defined, and which includes a base layer, a sensor layer disposed on the display layer, and including a plurality of sensing electrodes on which a plurality of first slots are defined, a lower member layer disposed below the display layer, and a cover layer disposed below the lower member layer, and having electrical conductivity, wherein a plurality of first through-holes, each of which is integrally penetrated, are defined in the base layer and the lower member layer, wherein when viewed on a plane, the plurality of first slots are disposed between the plurality of first through-holes, and when viewed on a plane, the plurality of first slots and the plurality of first through-holes overlap the cover layer.

In an embodiment, when viewed on a plane, the plurality of first through-holes and the plurality of first slots may overlap the active region.

In an embodiment, a metal may be coated along a surface of each of the plurality of first through-holes.

In an embodiment, the display layer may further include a common electrode disposed on the base layer, wherein a plurality of second slots respectively overlapping the plurality of first slots may be defined in the common electrode.

In an embodiment, the plurality of first slots may include a plurality of first row slots arranged in a first direction and a plurality of second row slots spaced apart from the plurality of first row slots in a second direction crossing the first direction, and arranged in the first direction.

BRIEF DESCRIPTION OF THE DRAWINGS

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings.

DETAILED DESCRIPTION

Figure 1:
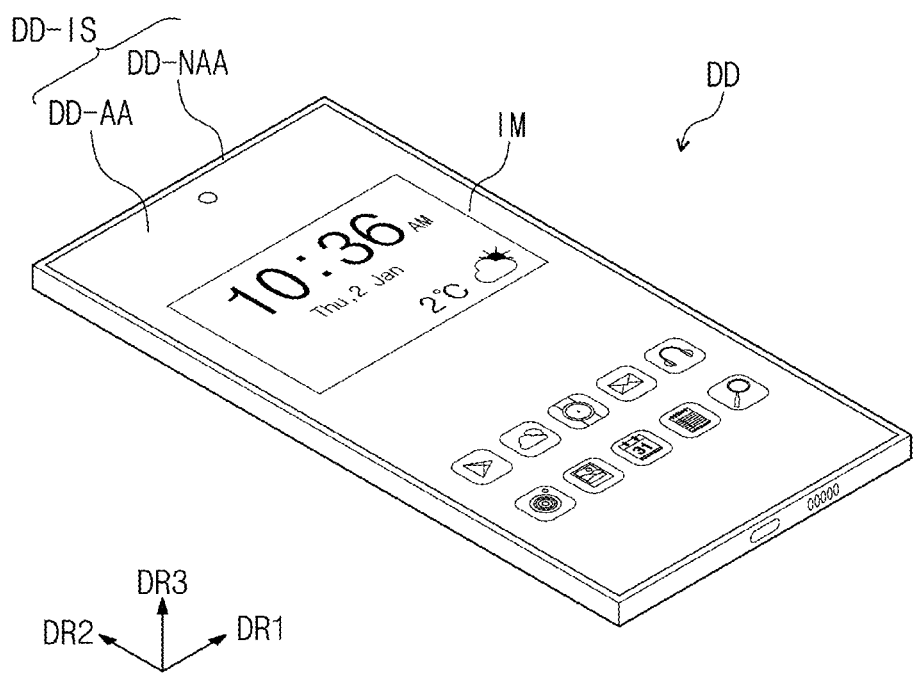
FIG. 1 is a perspective view of an electronic device according to an embodiment of the present disclosure.

In the present disclosure, when an element (or a region, a layer, a portion, and the like) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or," includes all combinations of one or more of which associated components may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present disclosure. The terms of a singular form may include plural forms unless the context clearly indicates otherwise.

In addition, terms such as "below," "lower," "above," "upper," and the like are used to describe the relationship of the components shown in the drawings. The terms are used as a relative concept and are described with reference to the direction indicated in the drawings.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, embodiments of the present disclosure will be described with reference to the accompanying drawings.

FIG. 1 is a perspective view of an electronic device according to an embodiment of the present disclosure.

Referring to FIG. 1, an electronic device DD may be a device activated according to an electrical signal. For example, the electronic device DD may be a mobile phone, a tablet computer, a car navigation system unit, a game console, or a wearable device, but is not limited thereto. In FIG. 1, the electronic device DD is illustrated as a mobile phone.

The electronic device DD may display an image IM through a display surface DD-IS. The display surface DD-IS may include an active region DD-AA and a peripheral region DD-NAA adjacent to the active region DD-AA. The active region DD-AA may be a region in which the image IM is displayed. The peripheral region DD-NAA may be a region in which the image IM is not displayed. The image IM may include a moving image and a still image. In FIG. 1, as an example of the image IM, a watch window and icon images are illustrated.

The active region DD-AA may be parallel to a surface defined by a first direction DR1 and a second direction DR2 crossing the first direction DR1. The normal direction of the active region DD-AA, that is, the thickness direction of the electronic device DD, may be indicated by a third direction DR3.

A front surface (or an upper surface) and a rear surface (or a lower surface) of each member or unit described hereinafter may be distinguished by the third direction axis DR3. The third direction DR3 may be a direction crossing the first direction DR1 and the second direction DR2. For example, the first direction DR1, the second direction DR2, and the third direction DR3 may be perpendicular to each other.

In the present disclosure, a surface defined by the first direction DR1 and the second direction DR2 is defined as a plane, and "viewed on a plane" may be defined as being viewed from the third direction DR3.

In addition, in the present disclosure, a surface defined by the first direction DR1 or the second direction DR2 and the third direction DR3 is defined as a side surface, and "when viewed on a side surface" may be defined as being viewed from the first direction DR1 or the second direction DR2.

Figure 2:
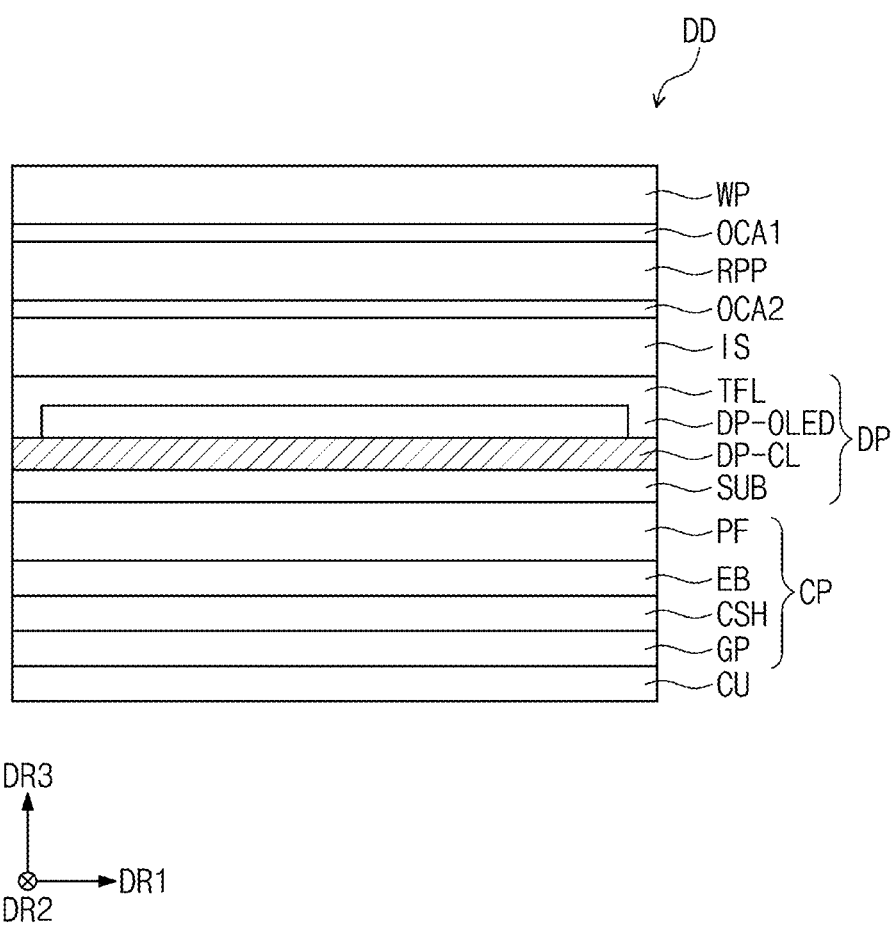
FIG. 2 is a schematic cross-sectional view of an electronic device according to an embodiment of the present disclosure.

FIG. 2 is a schematic cross-sectional view of an electronic device according to an embodiment of the present disclosure.

Referring to FIG. 2, the electronic device DD may include a window WP, a plurality of adhesive layers OCA1 and OCA2, a reflection prevention layer RPP, a sensor layer IS, a display layer DP, a lower member layer CP, and a cover layer CU.

The window WP may configure the appearance of the electronic device DD. The window WP may be a component which protects internal components of the electronic device DD from external impacts, and which substantially provides the active region DD-AA (see FIG. 1) of the electronic device DD. For example, the window WP may include a glass substrate, a sapphire substrate, or a plastic film. The window WP may have a multi-layered or single-layered structure. For example, the window WP may have a stacking structure in which a plurality of plastic films are coupled to each other with an adhesive, or a stacking structure in which a glass substrate and a plastic film are coupled to each other with an adhesive.

A first adhesive layer OCA1 may be disposed below the window layer WP. The window WP and the reflection prevention layer RPP may be coupled to each other by the adhesive layer OCA1. The first adhesive layer OCA1 may include a typical adhesive or a pressure-sensitive adhesive. For example, the first adhesive layer OCA1 may be an optically clear adhesive film, an optically clear resin, or a pressure sensitive adhesive film.

The reflection prevention layer RPP may be disposed below the window WP. The reflection prevention layer RPP may reduce the reflectance of natural light (or sunlight) incident from the above of the window WP.

The reflection prevention layer RPP according to an embodiment of the present disclosure may include a phase retarder and a polarizer. The phase retarder may be of a film type or a liquid crystal coating type, and may include a $\lambda/2$ phase retarder and/or a $\lambda/4$ phase retarder, wherein 2 is a wavelength. The polarizer may be of a film type or a liquid crystal coating type. The film type polarizer may include a stretchable synthetic resin film, and the liquid crystal coating type polarizer may include liquid crystals arranged in a predetermined arrangement. The phase retarder and the polarizer may further include a protective film. The phase retarder and the polarizer together or the protective film may be defined as a base layer of the reflection prevention layer RPP.

A second adhesive layer OCA2 may be disposed below the reflection prevention layer RPP. The reflection prevention layer RPP and the sensor layer IS may be coupled by the second adhesive layer OCA2. The second adhesive layer OCA2 and the first adhesive layer OCA1 may include substantially the same material. However, in another embodiment, the first adhesive layer OCA1 and the second adhesive layer OCA2 may have different materials.

The sensor layer IS may obtain the coordinate information of an external input. The sensor layer IS according to an embodiment of the present disclosure may be directly disposed on one surface of the display layer DP. For example, the sensor layer IS may be integrated with the display layer DP in an on-cell manner. The sensor layer IS and the display layer DP may be manufactured in a continuous process. However, the embodiment of the present disclosure is not limited thereto, and the sensor layer IS may be manufactured in a separate process, and then adhered to the display layer DP. The sensor layer IS may include a touch panel.

The sensor layer IS may transmit, receive, or transmit/receive a wireless communication signal, for example, a radio frequency signal. The sensor layer IS may include a plurality of antenna regions. The plurality of antenna regions may transmit, receive, or transmit/receive the same frequency band, or transmit, receive, or transmit/receive different frequency bands. The plurality of antenna regions will be described later.

The display layer DP may be disposed below the sensor layer IS. The display layer DP may be a component which generates the image IM (see FIG. 1). The display layer DP may be a light emission type display layer, but is not particularly limited thereto. For example, the display layer DP may include an organic light emission display layer, a quantum dot display layer, a micro-LED display layer, or a nano-LED display layer. The display layer DP may include a base layer SUB, a display circuit layer DP-CL, an image implementation layer DP-OLED, and a thin film encapsulation layer TFL. The above will be described later.

The lower member layer CP may be disposed below the display layer DP. That is, the lower member CP may be disposed on the base layer SUB. The lower member layer CP may include a protective layer PF, an embossed layer EB, a cushion layer CSH, and a heat dissipation sheet GP.

The protective layer PF may be disposed below the display layer DP. The protective layer PF may protect a lower surface of the display layer DP. The protective layer PF may include polyethylene terephthalate (PET). However, the material of the protective layer PF is not particularly limited thereto.

The embossed layer EB may be disposed below the protective layer PF. The embossed layer EB may have a color. For example, the embossed layer EB may be black. The embossed layer EB may absorb light incident on the embossed layer EB. The embossed layer EB may be a layer having adhesion on both surfaces thereof. The embossed layer EB may include a typical adhesive or pressure-sensitive adhesive. The protective layer PF and the cushion layer CSH may be coupled by the embossed layer EB.

The cushion layer CSH may be disposed below the embossed layer EB. The cushion layer CSH may have a function to alleviate pressure applied from the outside. The cushion layer CSH may include sponge, foam, a urethane resin, or the like. The thickness of the cushion layer CSH may be greater than the thickness of the embossed layer EB.

The heat dissipation sheet GP may be disposed below the cushion layer CSH. The heat dissipation sheet GP may induce the release of heat generated from the display layer DP. For example, the heat dissipation sheet GP may be a graphite sheet. In an embodiment of the present disclosure, a film layer may be further disposed between the cushion layer CSH and the heat dissipation sheet GP. The film layer may include polyimide (PI).

The cover layer CU may be disposed below the lower member layer CP. That is, the cover layer CU may be disposed on the heat dissipation sheet GP. The cover layer CU may have conductivity. For example, the cover layer CU may include copper (Cu). For example, the cover layer CU may be a copper (Cu) tape. However, the embodiment of the present disclosure is not limited thereto. A ground voltage may be applied to the cover layer CU. However, this is an example, and the cover layer CU may be floated.

Figure 3:
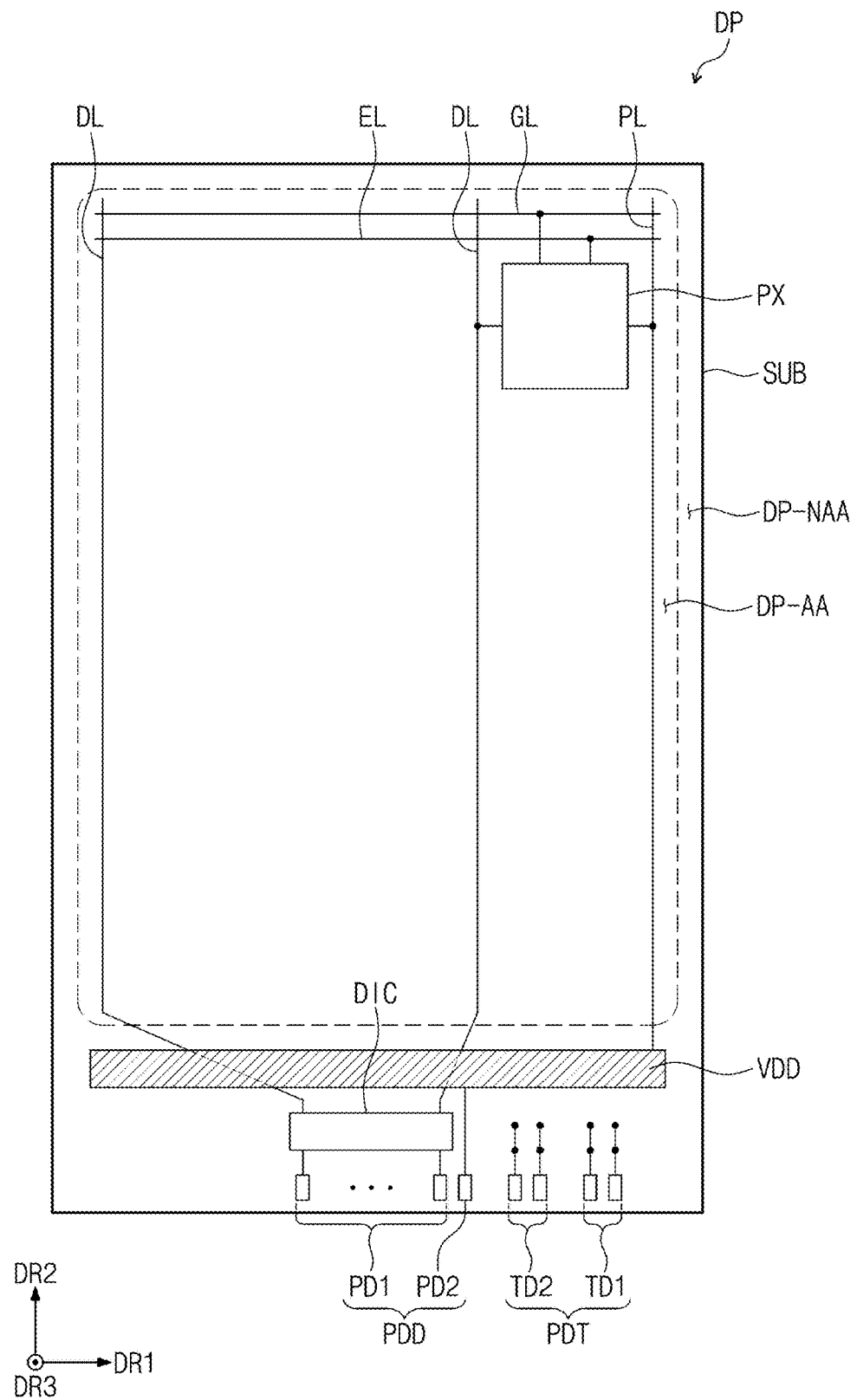
FIG. 3 is a top plan view of a display layer according to an embodiment of the present disclosure.

FIG. 3 is a top plan view of a display layer according to an embodiment of the present disclosure.

Referring to FIG. 3, the display layer DP may have an active region DP-AA and a peripheral region DP-NAA adjacent to the active region DP-AA, wherein the active region DP-AA may surround the peripheral region DP-NAA. The active region DP-AA may be a region in which an image is displayed. A plurality of pixels PX may be disposed in the active region DP-AA. In the peripheral region DP-NAA, a driving circuit, a driving line, or the like may be disposed. When viewed on a plane, the active region DP-AA may overlap the active region DD-AA (see FIG. 1) of the electronic device DD (see FIG. 1), and the peripheral region DP-NAA may overlap the peripheral region DD-NAA (see FIG. 1) of the electronic device DD (see FIG. 1).

The display layer DP may include the base layer SUB, the plurality of pixels PX, a plurality of signal lines GL, DL, PL, and EL, a plurality of display pads PDD, and a plurality of sensing pads PDT.

Each of the plurality of pixels PX may display one of primary colors or one of mixed colors. The primary colors may include red, green, or blue. The mixed colors may include various colors such as white, yellow, cyan, or magenta. However, a color displayed by each of the pixels PX is not limited thereto.

The plurality of signal lines GL, DL, PL, and EL may be disposed on the base layer SUB. The plurality of signal lines GL, DL, PL, and EL may be connected to the plurality of pixels PX to transmit electrical signals to the plurality of pixels PX. The plurality of signal lines GL, DL, PL, and EL may include a plurality of signal lines GL, a plurality of data lines DL, a plurality of power lines PL, and a plurality of light emission control lines EL. However, this is only an example, and configurations of the plurality of the signal lines GL, DL, PL, and EL according to an embodiment of the present disclosure are not limited thereto. For example, the plurality of signal lines GL, DL, PL, and EL according to an embodiment of the present disclosure may further include an initialization voltage line.

A power pattern VDD may be disposed in the peripheral region DP-NAA. The power pattern VDD may be connected to the plurality of power lines PL. The display layer DP may provide the same power signal to the plurality of pixels PX by including the power pattern VDD.

The plurality of display pads PDD may be disposed in the peripheral region DP-NAA. The plurality of display pads PDD may include a first pad PD1 and a second pad PD2. The first pad PD1 may be provided in plurality. Each of the plurality of first pads PD1 may be connected to each of the plurality of data lines DL. The second pad PD2 may be electrically connected to the plurality of power lines PL by being connected to the power pattern VDD. The display layer DP may provide electrical signals provided from the outside through the plurality of display pads PDD to the plurality of pixels PX. Meanwhile, the plurality of display pads PDD may further include pads for receiving other electrical signals in addition to the first pad PD1 and the second pad PD2, and are not limitation to any one embodiment.

A driving circuit DIC may be mounted in the peripheral region DP-NAA. The driving circuit DIC may be a timing control circuit in the form of a chip. Each of the plurality of data lines DL may be electrically connected to each of the plurality of first pads PD1 via the driving circuit DIC. However, this is an example, and the driving circuit DIC according to an embodiment of the present disclosure may be mounted on a film separated from the display layer DP. In this case, the driving circuit DIC may be electrically connected to the plurality of display pads PDD through the film.

The plurality of sensing pads PDT may be disposed in the peripheral region DP-NAA. The plurality of sensing pads PDT may be electrically connected to a plurality of sensing electrodes of the sensor layer IS (see FIG. 4A) to be described later, respectively. The plurality of sensing pads PDT may include a plurality of first sensing pads TD1 and a plurality of second sensing pads TD2.

Figure 4A:
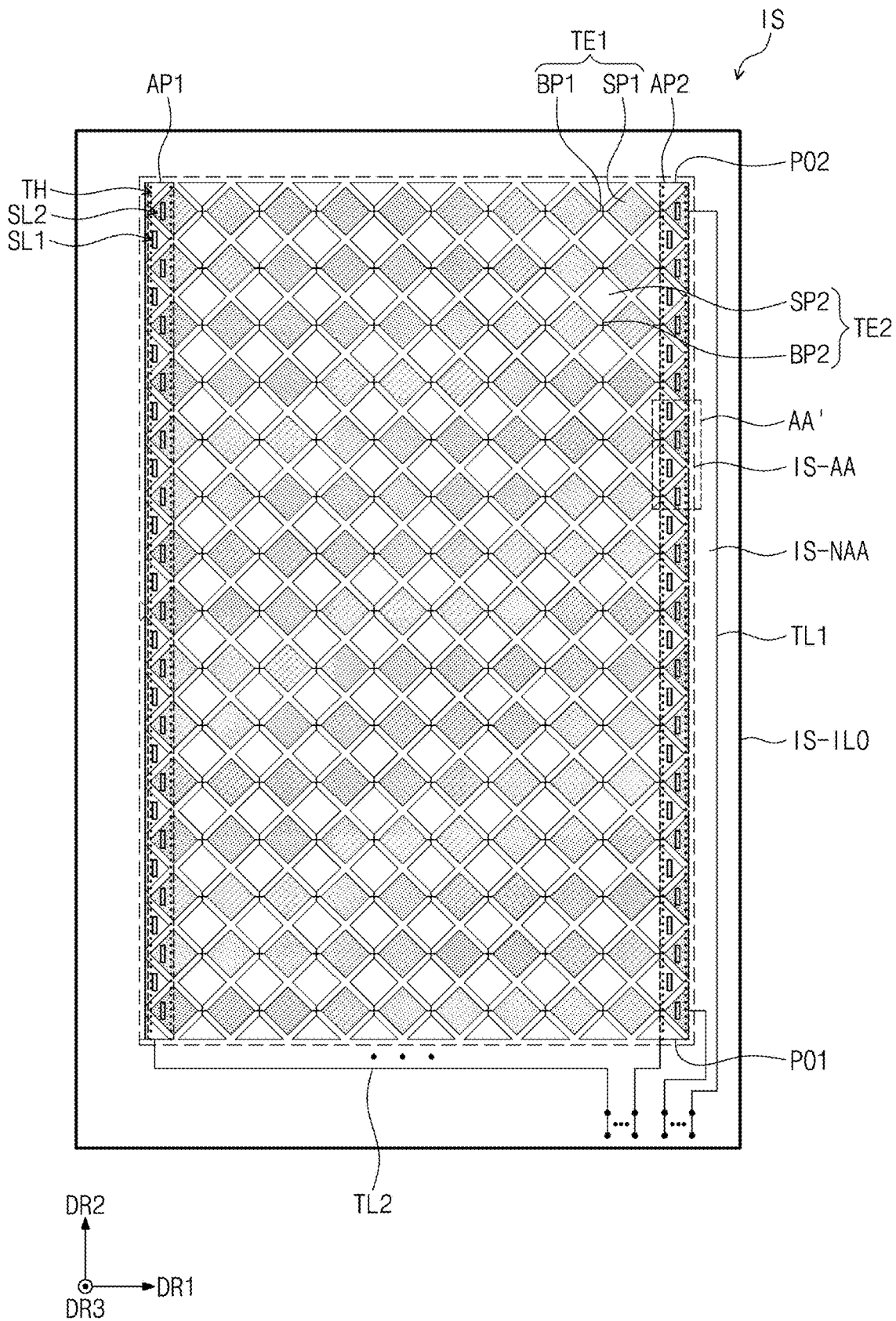
FIG. 4A is a top plan view of a sensor layer according to an embodiment of the present disclosure.

FIG. 4A is a top plan view of a sensor layer according to an embodiment of the present disclosure.

Referring to FIG. 4A, on the sensor layer IS, an active sensor region IS-AA and a peripheral sensor region IS-NAA adjacent to the active sensor region IS-AA, wherein the active sensor region IS-AA may surround the peripheral sensor region IS-NAA may be defined. The active sensor region IS-AA may be a region activated by an electrical signal. The active sensor region IS-AA may include a region which senses an input and at least one antenna region AP1 or AP2 which transmits, receives, or transmits/receives a wireless communication signal, for example, a radio frequency signal. In this case, for example, the antenna regions AP1 and AP2 may include a first antenna region AP1 and a second antenna region AP2. The first antenna region AP1 and the second antenna region AP2 may be spaced apart in the first direction DR1. The first antenna region AP1 may be disposed on the right side of the active sensor region IS-AA, and the second antenna region AP2 may be disposed on the left side of the active sensor region IS-AA. When viewed on a plane, the active sensor region IS-AA may overlap the active region DP-AA (see FIG. 3) of the display layer DP (see FIG. 3), and the peripheral sensor region IS-NAA may overlap the peripheral region DP-NAA (see FIG. 3) of the display layer DP (see FIG. 3).

The sensor layer IS may include a base insulation layer IS-ILO, a plurality of first sensing electrodes TE1, a plurality of second sensing electrodes TE2, and a plurality of sensing lines TL1 and TL2. The plurality of first sensing electrodes TE1 and the plurality of second sensing electrodes TE2 may be disposed in the active sensor region IS-AA. The plurality of sensing lines TL1 and TL2 may be disposed in the peripheral sensor region IS-NAA.

The antenna regions AP1 and AP2 may be disposed in the active sensor region IS-AA. The antenna regions AP1 and AP2 may be disposed in a region adjacent to the peripheral sensor region IS-NAA. The antenna regions AP1 and AP2 may overlap the plurality of first sensing electrodes TE1 and the plurality of second sensing electrodes TE2.

The antenna regions AP1 and AP2 may be composed of a substrate integrated waveguide (SIW). The above will be described later.

A signal may be provided to the antenna regions AP1 and AP2 through a first port PO1 and a second port PO2. That is, the first port PO1 and the second port PO2 may be components for power supply. A plurality of slots SL1 and SL2 may adjust beam steering based on power supplied through the first port PO1 and the second port PO2, and may focus a frequency signal in a specific direction to improve energy. For example, power supplied through the first port PO1 may be transmitted through the substrate integrated waveguide to the second port PO2.

The plurality of slots SL1 and SL2 may be defined in the antenna regions AP1 and AP2. The power supplied through the first port PO1 may be radiated to the air through the plurality of slots SL1 and SL2 while being transmitted to the second port PO2. That is, in the antenna regions AP1 and AP2, a signal may be radiated through a traveling wave.

The plurality of slots SL1 and SL2 may operate in a predetermined frequency band. The frequency band may include a resonant frequency. The resonant frequency may be about 23 GHz (gigahertz). However, this is only an example. The resonant frequency according to an embodiment of the present disclosure is not limited thereto. For example, the resonant frequency according to an embodiment of the present disclosure may be changed according to the frequency band of a signal to be communicated.

The plurality of slots SL1 and SL2 may be arranged in a zig-zag shape along the second direction DR2. The plurality of slots S11 and SL2 may overlap the active region IS-AA.

When viewed on a plane, a plurality of first through-holes TH may overlap a plurality of sensing electrodes TE1 and TE2.

The base insulation layer IS-ILO may be an inorganic layer including any one of silicon nitride, silicon oxynitride, and silicon oxide. Alternatively, the base insulation layer IS-ILO may be may organic layer including an epoxy resin, an acrylic resin, or an imide-based resin. The base insulation layer IS-ILO may be directly formed on the display layer DP (see FIG. 3). Alternatively, the base insulation layer IS-ILO and the display layer DP (see FIG. 3) may be coupled to each other through an adhesive member.

The sensor layer IS may acquire information on an external input through a change in capacitance between the plurality of first sensing electrodes TE1 and the plurality of second sensing electrodes TE2.

Each of the plurality of first sensing electrodes TE1 may be extended along the first direction DR1, and the plurality of first sensing electrodes TE1 may be arranged along the second direction DR2. Each of the plurality of first sensing electrodes TE1 may include a plurality of first portions SP1 and a plurality of second portions BP1. Each of the second portions BP1 may electrically connect two first portions SP1 adjacent to each other along the first direction DR1. The plurality of first portions SP1 and the plurality of second portions BP2 may have a mesh structure.

Each of the plurality of second sensing electrodes TE2 may be extended along the second direction DR2, and the plurality of second sensing electrodes TE2 may be arranged along the second direction DR1. Each of the plurality of second sensing electrodes TE2 may include a plurality of sensing patterns SP2 and a plurality of bridge patterns BP2. Each of the bridge patterns BP2 may electrically connect two sensing patterns SP2 adjacent to each other. The plurality of sensing patterns SP2 may have a mesh structure.

FIG. 4A illustrates that one bridge pattern BP2 is connected to two sensing patterns SP2 adjacent to each other, but the connection relationship of the plurality of bridge patterns BP2 and the plurality of sensing patterns SP2 according to an embodiment of the present disclosure is not limited thereto. For example, two sensing patterns SP2 adjacent to each other may be connected by two bridge patterns BP2 along the second direction DR2.

The plurality of second portions BP1 and the plurality of bridge patterns BP2 may be disposed in different layers. The plurality of bridge patterns BP2 may cross the plurality of first sensing electrodes TE1 while being insulated therefrom. For example, each of the plurality of second portions BP1 may cross each of the plurality of bridge patterns BP2 while being insulated therefrom.

The plurality of sensing lines TL1 and TL2 may include a plurality of first sensing lines TL1 and a plurality of second sensing lines TL2. The plurality of first sensing lines TL1 may be electrically connected to the plurality of first sensing electrodes TE1, respectively. The plurality of second sensing lines TL2 be may be electrically connected to the plurality of second sensing electrodes TE2, respectively. Each of the plurality of sensing lines TL1 and TL2 may have a mesh structure.

The plurality of first sensing pads TD1 (see FIG. 3) may be electrically connected to the plurality of first sensing electrodes TL1, respectively, through a contact hole. The plurality of second sensing pads TD2 (see FIG. 3) may be electrically connected to the plurality of second sensing electrodes TL2, respectively.

Figure 4B:
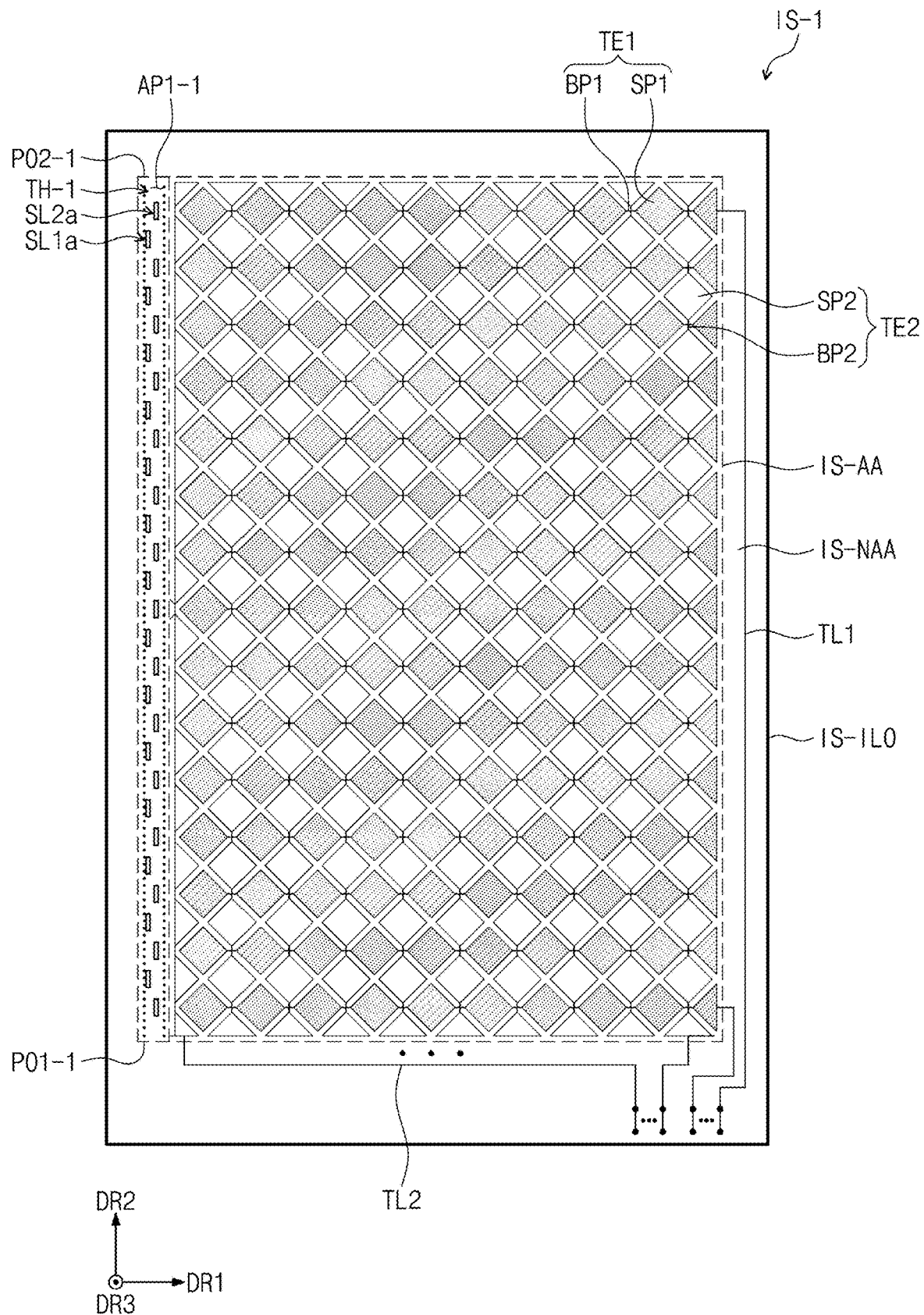
FIG. 4B is a top plan view of a sensor layer according to an embodiment of the present disclosure.

FIG. 4B is a top plan view of a sensor layer according to an embodiment of the present disclosure. In describing FIG. 4B, the same reference numerals are given to the components described with reference to FIG. 4A, and the descriptions thereof are omitted.

Referring to FIG. 4B, the sensor layer IS-1 may have the active sensor region IS-AA and the peripheral sensor region IS-NAA. An antenna region AP1-1 may overlap the active sensor region IS-AA and may be disposed on right side of the active sensor region IS-AA. The antenna region AP1-1 may be spaced apart from the plurality of sensing electrodes TE1 and TE2 in the first direction DR1.

A signal may be provided to the antenna regions AP1-1 through a first port PO1-1 and a second port PO2-1.

A plurality of slots SL1a and SL2a may be defined in the antenna region AP1-1. The plurality of slots SL1a and SL2a may be arranged in a zig-zag shape along the second direction DR2.

When viewed on a plane, the antenna region AP1-1 may not overlap the plurality of sensing electrodes TE1 and TE2. That is, a plurality of first through-holes TH-1 may not overlap the plurality of sensing electrodes TE1 and TE2.

Figure 5:
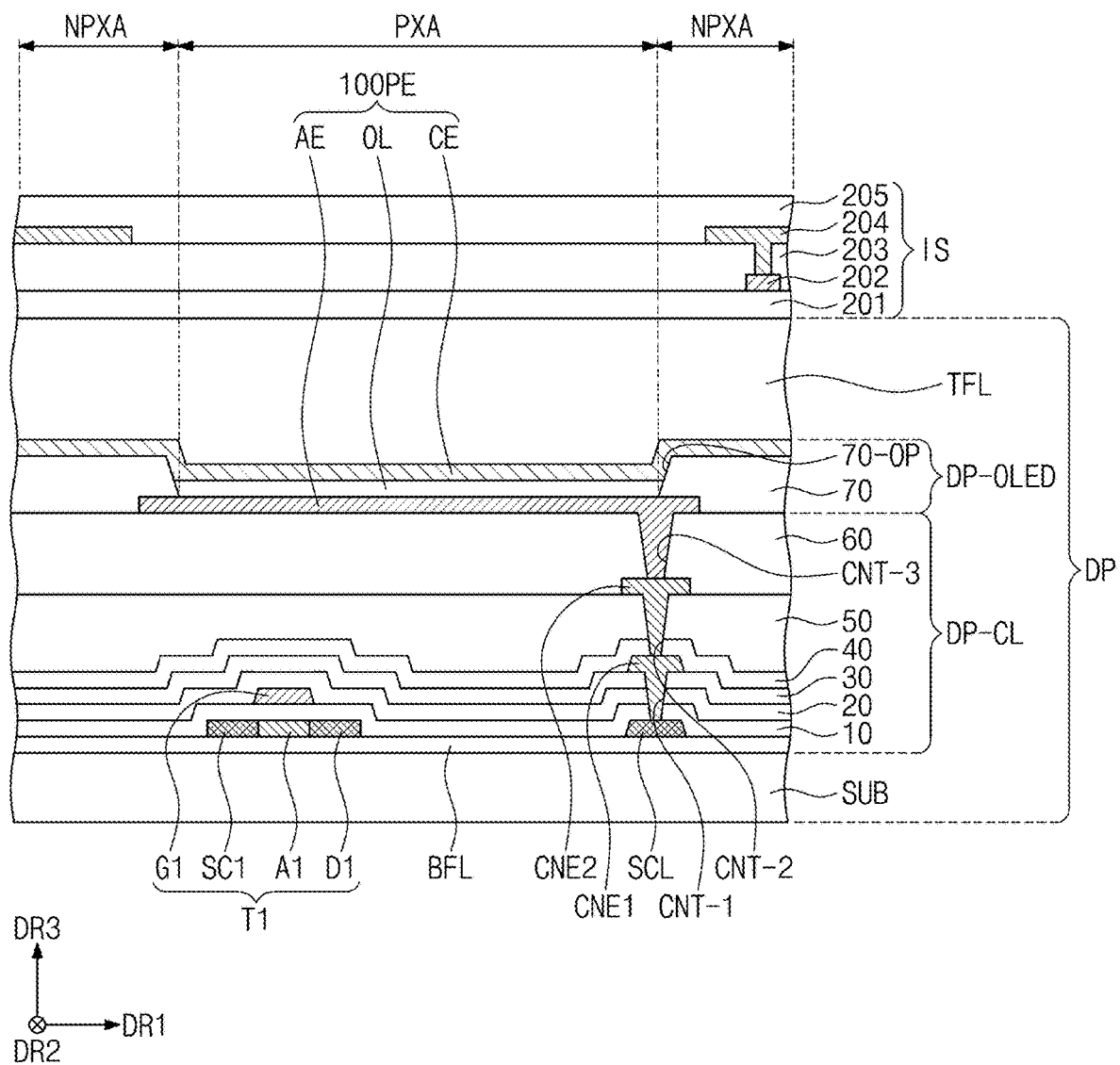
FIG. 5 is a cross-sectional view of a portion of an electronic device according to an embodiment of the present disclosure.

FIG. 5 is a cross-sectional view of a portion of an electronic device according to an embodiment of the present disclosure.

Referring to FIG. 5, at least one inorganic layer may be formed on an upper surface of the base layer SUB. The inorganic layer may include at least one of aluminum oxide, titanium oxide, silicon oxide, silicon oxynitride, zirconium oxide, or hafnium oxide. The inorganic layer may be formed as a multi-layered inorganic layer. The multi-layered inorganic layers may constitute the barrier layer and/or the buffer layer. In the present embodiment, the display layer DP may include a buffer layer BFL.

The buffer layer BFL may improve the coupling force between the base layer SUB and a semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. The semiconductor pattern may include polysilicon. However, the embodiment of the present disclosure is not limited thereto. The semiconductor pattern may include amorphous silicon, low-temperature polycrystalline silicon, or an oxide semiconductor.

FIG. 5 only illustrates a portion of the semiconductor pattern, and the semiconductor pattern may be further disposed in another region. The semiconductor pattern may be arranged according to a specific rule across pixels. The semiconductor pattern may have different electrical properties depending on whether or not the semiconductor pattern is doped. The semiconductor pattern may include a first region having a high conductivity rate and a second region having a low conductivity rate. The first region may be doped with an N-type dopant or a P-type dopant. A P-type transistor may include a doped region which has been doped with the P-type dopant, and an N-type transistor may include a doped region which has been doped with the N-type dopant. The second region may be a non-doped region, or may be doped to lower concentration than the first region.

The conductivity of the first region may be greater than the conductivity of the second region, and the first region may substantially serve as an electrode or a signal line. The second region may substantially correspond to an active (or a channel) of a transistor. In other words, a portion of the semiconductor pattern may be an active of the transistor, another portion thereof may be a source or a drain of the transistor, and the other portion thereof may be a connection electrode or a connection signal line.

Each of the pixels may have an equivalent circuit including seven transistors, one capacitor, and a light emitting element, and the equivalent circuit of a pixel may be modified in various forms. FIG. 5 illustrates one transistor T1 and a light emitting element 100PE included in a pixel.

The transistor T1 may include a source SC1, an active A1, a drain D1, and a gate G1. The source SC1, the active A1, and the drain D1 may be formed from a semiconductor pattern. The source SC1 and the drain D1 may be disposed in opposite directions from the active A1 on a cross section. FIG. 5 illustrates a portion of a connection signal line SCL formed from the semiconductor pattern. Although not separately illustrated, the connection signal line SCL may be electrically connected to the drain D1 of the transistor T1 on a plane.

A first insulation layer 10 may be disposed on the buffer layer BFL. The first insulation layer 10 commonly overlaps a plurality of pixels, and may cover the semiconductor pattern. The first insulation layer 10 may be an inorganic layer and/or an organic layer, and may have a single-layered structure or a multi-layered structure. The first insulation layer 10 may include at least one of aluminum oxide, titanium oxide, silicon oxide, silicon nitride, silicon oxynitride, zirconium oxide, or hafnium oxide. In the present embodiment, the first insulation layer 10 may be a silicon oxide layer of a single layer. Not only the first insulation layer 10 but also an insulation layer of the display circuit layer DP-CL to be described layer may be an inorganic layer and/or an organic layer, and may have a single-layered or multi-layered structure. The inorganic layer may include at least one of the above-described materials, but the embodiment of the present disclosure is not limited thereto.

The gate G1 is disposed on the first insulation layer 10. The gate G1 may be a portion of a metal pattern. The gate G1 overlaps the active A1. In a process of doping the semiconductor pattern, the gate G1 may function as a mask.

A second insulation layer 20 is disposed on the first insulation layer 10, and may cover the gate G1. The second insulation layer 20 may commonly overlap pixels. The second insulation layer 20 may be an inorganic layer and/or an organic layer, and may have a single-layered or multi-layered structure. The second insulation layer 20 may include at least one of silicon oxide, silicon nitride, or silicon oxynitride. In the present embodiment, the second insulation layer 20 may have a multi-layered structure including a silicon oxide layer and a silicon nitride layer.

The third insulation layer 30 may be disposed on the second insulation layer 20. The third insulation layer 30 may have a single-layered or multi-layered structure. For example, the third insulation layer 30 may have a multi-layered structure including a silicon oxide layer and a silicon nitride layer.

A first connection electrode CNE1 may be disposed on the third insulation layer 30. The first connection electrode CNE1 may be connected to the connection signal line SCL through a first contact hole CNT-1 penetrating through the first to third insulation layers 10, 20, and 30.

A fourth insulation layer 40 may be disposed on the third insulation layer 30. The fourth insulation layer 40 may be a silicon oxide layer of a single layer. A fifth insulation layer 50 may be disposed on the fourth insulation layer 40. The fifth insulation layer 50 may be an organic layer.

A second connection electrode CNE2 may be disposed on the fifth insulation layer 50. The second connection electrode CNE2 may be connected to the first connection electrode CNE1 through a second contact hole CNT-2 penetrating through the fourth insulation layer 40 and the fifth insulation layer 50.

A sixth insulation layer 60 is disposed on the fifth insulation layer 50, and may cover the second connection electrode CNE2. The sixth insulation layer 60 may be an organic layer.

The image implementation layer DP-OLED may be disposed on the display circuit layer DP-CL. The image implementation layer DP-OLED may include the light emitting element 100PE. For example, the image implementation layer DP-OLED may include an organic light emission material, a quantum dot, a quantum rod, a micro-LED, or a nano-LED. Hereinafter, the light emitting element 100PE is exemplarily described as being an organic light emitting element, but the embodiment of the present disclosure is not particularly limited thereto.

The light emitting element 100PE may include a first electrode AE, a light emitting layer OL, and a second electrode CE. The first electrode AE may be disposed on the sixth insulation layer 60. The first electrode AE may be connected to the second connection electrode CNE2 through a third contact hole CNT-3 penetrating through the sixth insulation layer 60.

A pixel definition film 70 is disposed on the sixth insulation layer 60, and may cover a portion of the first electrode AE. In the pixel definition film 70, an opening 70-OP is defined. The opening 70-OP of the pixel definition film 70 exposes at least a portion of the first electrode AE.

The active region DP-AA (see FIG. 3) may include a light emitting region PXA and a non-light emitting region NPXA adjacent to the light emitting region PXA. The non-light emitting region NPXA may surround the light emitting region PXA. In the present embodiment, the light emitting region PXA is defined to correspond to some regions of the first electrode AE exposed by the opening 70-OP.

The light emitting layer OL may be disposed on the first electrode AE. The light emitting layer OL may be disposed in a region corresponding to the opening 70-OP. That is, the light emitting layer OL may be separately formed on each of the pixels. When the light emitting layer OL is separately formed on each of the pixels, each of the light emitting layers OL may emit light of at least one color of blue, red, or green. However, the embodiment of the present disclosure is not limited thereto, and the light emitting layer OL may be connected to the pixels and commonly provided. In this case, the light emitting layer OL may provide blue light or white light.

The second electrode CE may be disposed on the light emitting layer OL. The second electrode CE has a shape of a single body, and may be commonly disposed in the plurality of pixels. The second electrode CE may be referred to as a common electrode CE.

Although not illustrated, a hole control layer may be disposed between the first electrode AE and the light emitting layer OL. The hole control layer may be commonly disposed in the light emitting region PXA and the non-light emitting region NPXA. The hole control layer includes a hole transport layer, and may further include a hole injection layer. An electron control layer may be disposed between the light emitting layer OL and the second electrode CE. The electron control layer includes an electron transport layer, and may further include an electron injection layer. The hole control layer and the electron control layer may be commonly formed on the plurality of pixels using an open mask.

The thin film encapsulation layer TFL may be disposed on the image implementation layer DP-OLED. For example, the thin film encapsulation layer TFL may include an inorganic layer, an organic layer, and an inorganic layer sequentially stacked, but layers constituting the thin film encapsulation layer TFL are not limited thereto.

The inorganic layers may protect the light implementation image DP-OLED from moisture and oxygen, and the organic layer may protect the light image implementation layer DP-OLED from foreign materials such as dust particles. The inorganic layers may include a silicon nitride layer, a silicon oxynitride layer, a silicon oxide layer, a titanium oxide layer, an aluminum oxide layer, or the like. The organic layer may include an acrylic organic layer, but the embodiment of the present disclosure is not limited thereto.

The sensor layer IS may be formed on the display layer DP through a continuous process. In this case, the sensor layer IS may be expressed as being directly disposed on the display layer DP. The meaning of "being directly disposed" may mean that a third component is not disposed between the sensor layer IS and the display layer DP. That is, a separate adhesive member may not be disposed between the sensor layer IS and the display layer DP. Alternatively, the sensor layer IS may be coupled to the display layer DP through an adhesive member. The adhesive member may include a typical adhesive or pressure-sensitive adhesive.

The sensor layer IS may include a base insulation layer 201, a first conductive layer 202, a sensing insulation layer 203, a second conductive layer 204, and a cover insulation layer 205.

The base insulation layer 201 may be an inorganic layer including at least one of silicon nitride, silicon oxynitride, or silicon oxide. Alternatively, the base insulation layer 201 may be an organic layer including an epoxy resin, an acrylic resin, or an imide-based resin. The base insulation layer 201 may have a single-layered structure, or a multi-layered structure in which layers are stacked along the third direction DR3.

Each of the first conductive layer 202 and the second conductive layer 204 may have a single-layered structure, or a multi-layered structure in which layers are stacked along the third direction DR3.

A conductive layer of a single-layered structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium tin zinc oxide (ITZO), or the like. In addition, the transparent conductive layer may include a conductive polymer such as PEDOT, a metal nanowire, graphene, and the like.

A conductive layer of a multi-layered structure may include metal layers. The metal layers may have, for example, a three-layered structure of titanium/aluminum/titanium. The conductive layer of a multi-layered structure may include at least one metal layer and at least one transparent conductive layer.

At least one of the sensing insulation layer 203 and the cover insulation layer 205 may include an inorganic film. The inorganic film may include at least one of aluminum oxide, titanium oxide, silicon oxide, silicon nitride, silicon oxynitride, zirconium oxide, or hafnium oxide.

At least one of the sensing insulation layer 203 and the cover insulation layer 205 may include an organic film. The organic film may include at least any one among an acrylic resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 6:
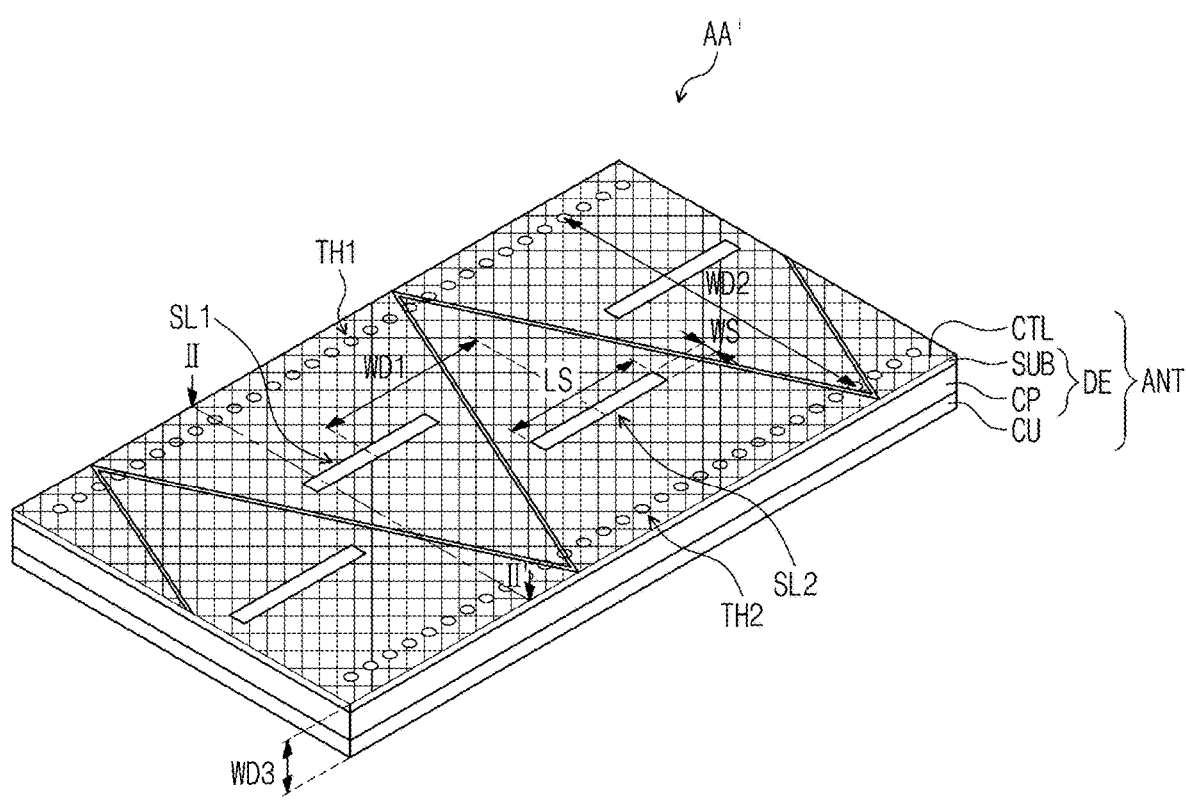
FIG. 6 is a perspective view of an electronic device illustrating an enlarged region AA' of FIG. 4 according to an embodiment of the present disclosure.
Figure 6:
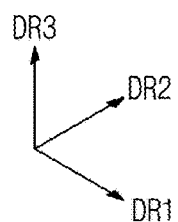
Figure 7:
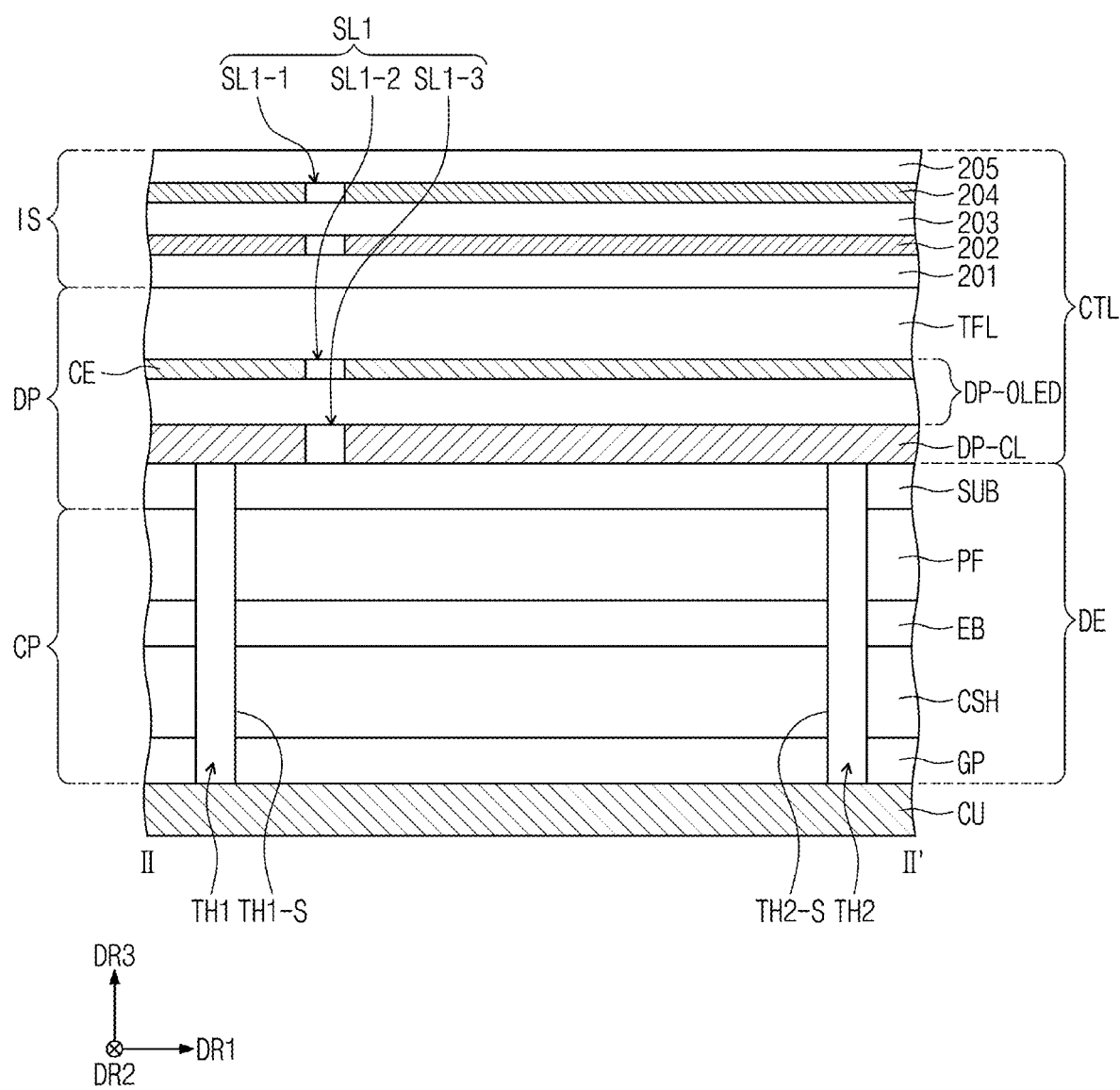
FIG. 7 is a cross-sectional view taken along line II-II' of FIG. 6 according to an embodiment of the present disclosure.

FIG. 6 is a perspective view of an electronic device illustrating an enlarged region AA' of FIG. 4A according to an embodiment of the present disclosure, FIG. 7 is a cross-sectional view taken along line II-IP of FIG. 6 according to an embodiment of the present disclosure.

Referring to FIG. 6 and FIG. 7, an antenna ANT may be defined in the antenna regions AP1 and AP2 (see FIG. 4A). The antenna ANT may include a metal layer CTL, a dielectric layer DE, and the cover layer CU.

The antenna regions AP1 and AP2 (see FIG. 4A) may be composed of a substrate integrated waveguide (SIW). The substrate integrated waveguide may refer to a synthetic rectangular electromagnetic waveguide formed in the dielectric layer DE by densely arranging a plurality of metalized first through-holes TH1 and TH2 connecting upper and lower metal plates of a substrate. At this time, the plurality of first through-holes TH1 and TH2 may prevent a traveling wave from leaking. The upper metal plate may be the metal layer CTL. The lower metal plate may be the cover layer CU.

The plurality of slots SL1 and SL2 may be defined in the metal layer CTL. The plurality of slots SL1 and SL2 may include a plurality of first row slots SL1 and a plurality of second row slots SL2. The plurality of first row slots SL1 may be arranged in the second direction DR2. Each of the plurality of first row slots SL1 may be extended in the second direction DR2. The plurality of second row slots SL2 may be spaced apart from the plurality of first row slots SL1 in the first direction DR1. The plurality of second row slots SL2 may be arranged in the second direction DR2. Each of the plurality of second row slots SL2 may be extended in the second direction DR2.

Each of the plurality of slots SL1 and SL2 may have a first width LS in the second direction DR2. The first width LS may be inversely proportional to a resonant frequency of an antenna. The first width LS may be about 3 mm (millimeter) to about 4 mm. For example, the first width LS may be about 3.5 mm.

Each of the plurality of slots SL1 and SL2 may have a second width WS in the first direction DR1. The second width WS may be calculated based on impedance matching of the antenna. The second width WS may be about 0.25 mm to about 0.35 mm. For example, the second width WS may be about 0.3 mm.

According to the present disclosure, the plurality of slots SL1 and SL2 may be disposed in the antenna regions AP1 and AP2 (see FIG. 4A). The plurality of slots SL1 and SL2 may include a plurality of first row slots SL1 and a plurality of second row slots SL2. Each of the plurality of first row slots SL1 and the plurality of second row slots SL2 may be extended in the second direction DR2 and may be arranged in a zig-zag shape. That is, it is possible to improve radiation performance of the antenna ANT by forming a number of slots SL1 and SL2 in the antenna regions AP1 and AP2 (see FIG. 4A).

When viewed from the side, a distance WD1 which is between the center of one first row slot SL1 and the center of one second row slot SL2 adjacent to the first row slot SL1 in the second direction DR2 may be about 3.5 mm. The distance WD1 may be the same as the value of the first width LS.

As depicted in FIG. 7, the metal layer CTL may include a first conductive layer 202, a second conductive layer 204, the common electrode CE, and the display circuit layer DP-CL.

The plurality of slots SL1 may include a first slot SL1-1, a second slot SL1-2, and a third slot SL1-3.

A plurality of first slots SL1-1 may be defined in the first conductive layer 202 and/or the second conductive layer 204.

Each of the first conductive layer 202 and the second conductive layer 204 may have a three-layered structure of titanium/aluminum/titanium. Each of the first conductive layer 202 and the second conductive layer 204 may have a mesh structure. The thickness of the first conductive layer 202 or the second conductive layer 204 may be about 0.20 um (micrometer) or about 0.30 um. For example, the thickness of the first conductive layer 202 and the second conductive layer 204 may be about 0.25 um.

In the common electrode CE, a plurality of second slots SL1-2 respectively overlapping the plurality of first slots SL1-1 may be defined. The plurality of second slots SL1-2 may correspond to the plurality of first slot SL1-1.

The common electrode CE may include an electrode made of a silver (Ag)-magnesium (Mg) alloy. The thickness of the common electrode CE may be about 0.005 um to about 0.015 um. For example, the thickness of the common electrode CE may be about 0.01 um.

In the display circuit layer DP-CL, a plurality of third slots SL3-1 respectively overlapping the plurality of second slots SL1-2 may be defined. The plurality of third slots SL1-3 may correspond to the plurality of second slot SL2-1. Thus, the first slot SL1-1, the second slot SL1-2, and the third slot SL1-3 may correspond to each other along the third direction DR3.

The display circuit layer DP-CL may include the plurality of signal lines GL, DL, PL, and EL (see FIG. 3). The thickness of the display circuit layer DP-CL may be about 0.20 um (micrometer) to about 0.30 um. For example, the thickness of the display circuit layer DP-CL may be about 0.25 um.

The dielectric layer DE may be disposed below the metal layer CTL. The dielectric layer DE may include the base layer SUB and the lower member layer CP.

The plurality of first through-holes TH1 and TH2 may be defined in the dielectric layer DE. Each of the plurality of first through-holes TH1 and TH2 may be formed by integrally penetrating between the base layer SUB and the lower member layer CP. Each of the plurality of first through-holes TH1 and TH2 may be penetrated in the third direction DR3.

On side surfaces TH1-S and TH2-S of each of the plurality of first through-holes TH1 and TH2, a metal may be disposed. For example, copper (Cu) may be coated along the side surfaces TH1-S and TH2-S of each of the plurality of first through-holes TH1 and TH2. However, this is an example, and a metal may be filled inside each of the plurality of first through-holes TH1 and TH2 according to an embodiment of the present disclosure.

An electromagnetic wave provided through the first port PO1 (see FIG. 4A) or the second port PO2 (see FIG. 4A) may be trapped and moved between the plurality of first through-holes TH1 and TH2.

The plurality of first through-holes TH1 and TH2 may include a plurality of first column through-holes TH1 and a plurality of second column through-holes TH2 spaced apart from the plurality of first column through-holes TH1.

Each of the plurality of first column through-holes TH1 may be arranged in the second direction DR2.

Each of the plurality of second column through-holes TH2 may be arranged in the second direction DR2.

When viewed on a plane, the plurality of first column through-holes TH1 and the plurality of second column through-holes TH2 may be spaced apart from each other with the plurality of slots SL1 and SL2 interposed therebetween.

Referring back to FIG. 6, a width WD2 extended between the plurality of first column through-holes TH1 and the plurality of second column through-holes TH2 in the first direction DR1 may determine a cutoff frequency. The cutoff frequency may be calculated by dividing the speed of light by a value obtained by multiplying twice the width WD2 by the square root of the effective permittivity.

The width WD2 may be about 4 mm to about 6 mm. For example, the width WD2 may be about 5 mm. At this time, the cutoff frequency may be about 19 GHz (gigahertz).

The dielectric layer DE may be disposed below the metal layer CTL. The dielectric layer DE may include the base layer SUB, the protective layer PF, the embossed layer EB, the cushion layer CSH, and the heat dissipation sheet GP. The thickness of the base layer SUB may be about 14 um to about 18 um. For example, the thickness of the base layer SUB may be about 16 um. The thickness of the protective layer PF may be about 90 um to about 110 um. For example, the thickness of the protective layer PF may be about 100 um. The thickness of the heat dissipation sheet GP may be about 250 um to about 300 um. For example, the thickness of the heat dissipation sheet GP may be about 275 um.

A twofold value of the thickness of the dielectric layer DE may be greater than the width WD2. Through the above, the antenna ANT may operate as a substrate integrated waveguide (SIW).

The cover layer CU may be disposed below the dielectric layer DE. The cover layer CU may include a metal. For example, the cover layer CU may include copper (Cu).

When viewed on a plane, the cover layer CU may overlap the plurality of first through-holes TH1 and TH2 and the plurality of slots SL1 and SL2.

Figure 8:
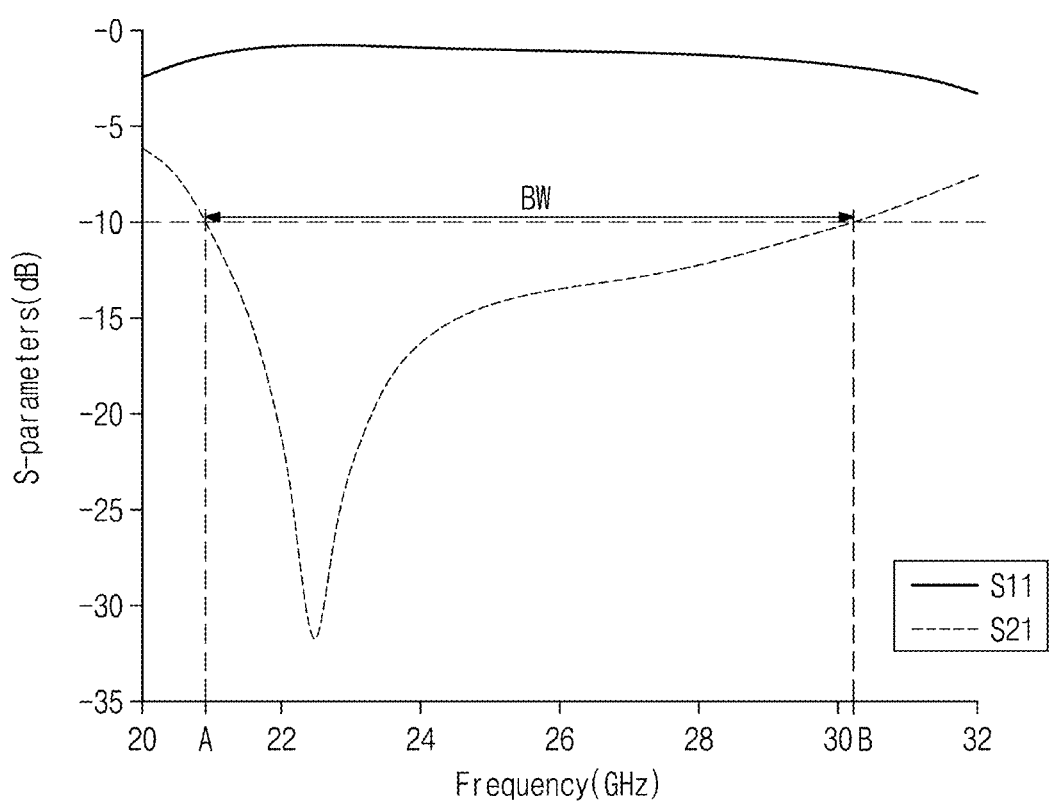
FIG. 8 is a graph view illustrating S parameter in accordance with a frequency according to an embodiment of the present disclosure.

FIG. 8 is a graph view illustrating S parameter in accordance with a frequency according to an embodiment of the present disclosure.

Referring to FIGS. 6, 7, and 8, S11 may be one among S-parameters. S11 may be a value represented as a ratio of the magnitude of a signal reflected by an input signal to the magnitude of the input signal. For example, the input signal may be a signal provided through the first port PO1 (see FIG. 4A). For example, S11 may be a reflection coefficient of the antenna ANT. When determining the operation of the antenna ANT, the determination may be based on when a S11 value is about −10 dB. −10 dB may be a case in which the magnitude of a signal reflected by an input signal relative to the magnitude of the input signal is 10%. When S11 is less than −10 dB, the antenna ANT may be determined to operate in a corresponding frequency band.

The antenna ANT may operate between A and B. A may be about 20.9 GHz. B may be about 30.2 GHz. That is, the antenna ANT may operate in a frequency band BW.

S21 may be a value represented as a ratio of the magnitude of an output signal to the magnitude of an input signal. For example, the output signal may be a signal received through the second port PO2 (see FIG. 4A). S21 may determine whether the antenna ANT operates as a substrate integrated waveguide or not. For example, when operated at a frequency less than or equal to a cutoff frequency calculated by a width WD between the through-holes TH1 and TH2, the antenna ANT may not operate. That is referring to S21, it can be confirmed that the antenna ANT may operate in the frequency band BW.

Figure 9:
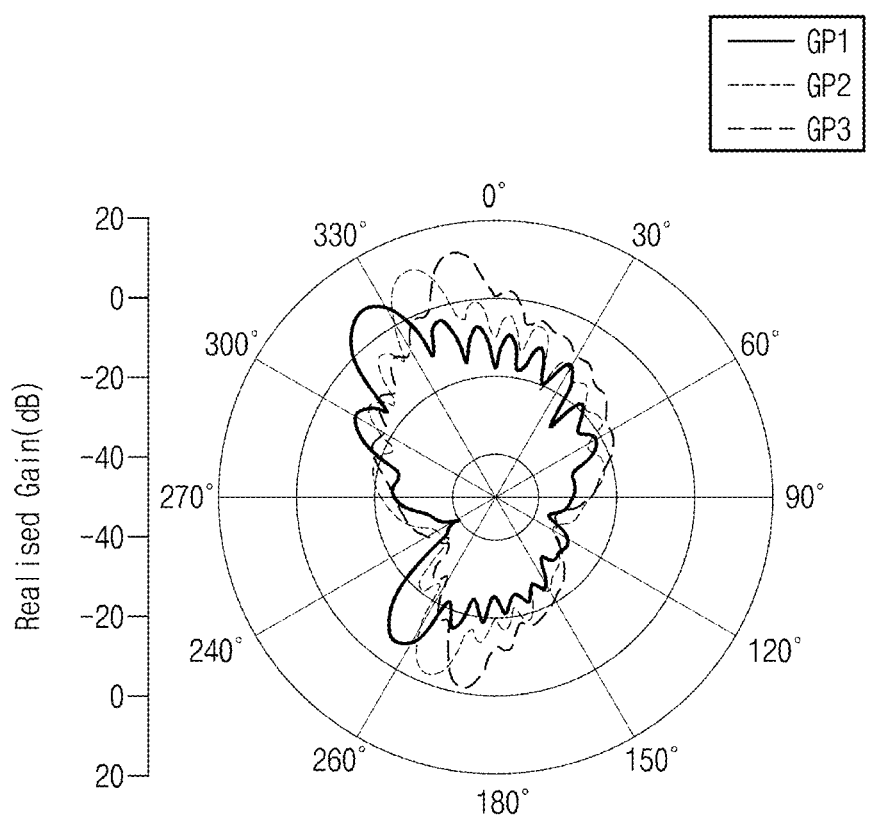
FIG. 9 is a view illustrating the radiation pattern of an antenna according to an embodiment of the present disclosure.
Figure 10A:
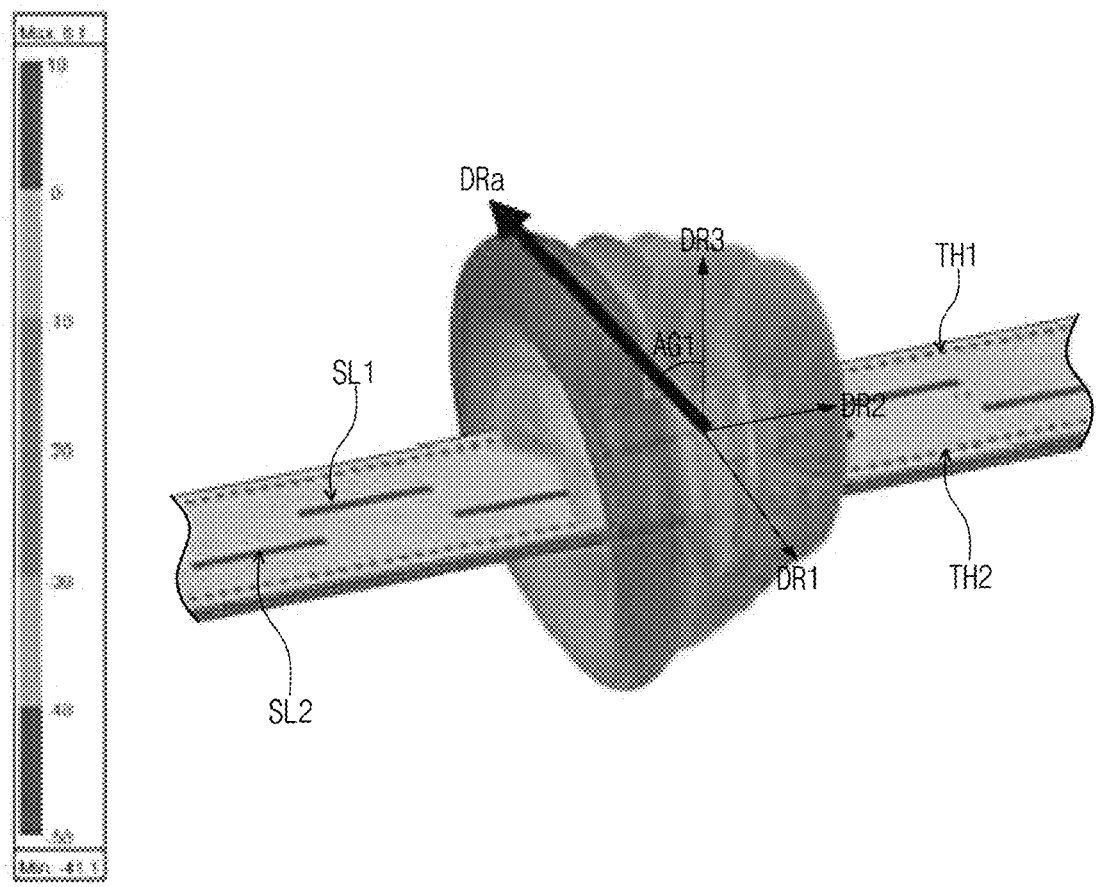
FIGS. 10A, 10B, and 10C are views illustrating the radiation pattern of an antenna by frequency according to an embodiment of the present disclosure.
Figure 10B:
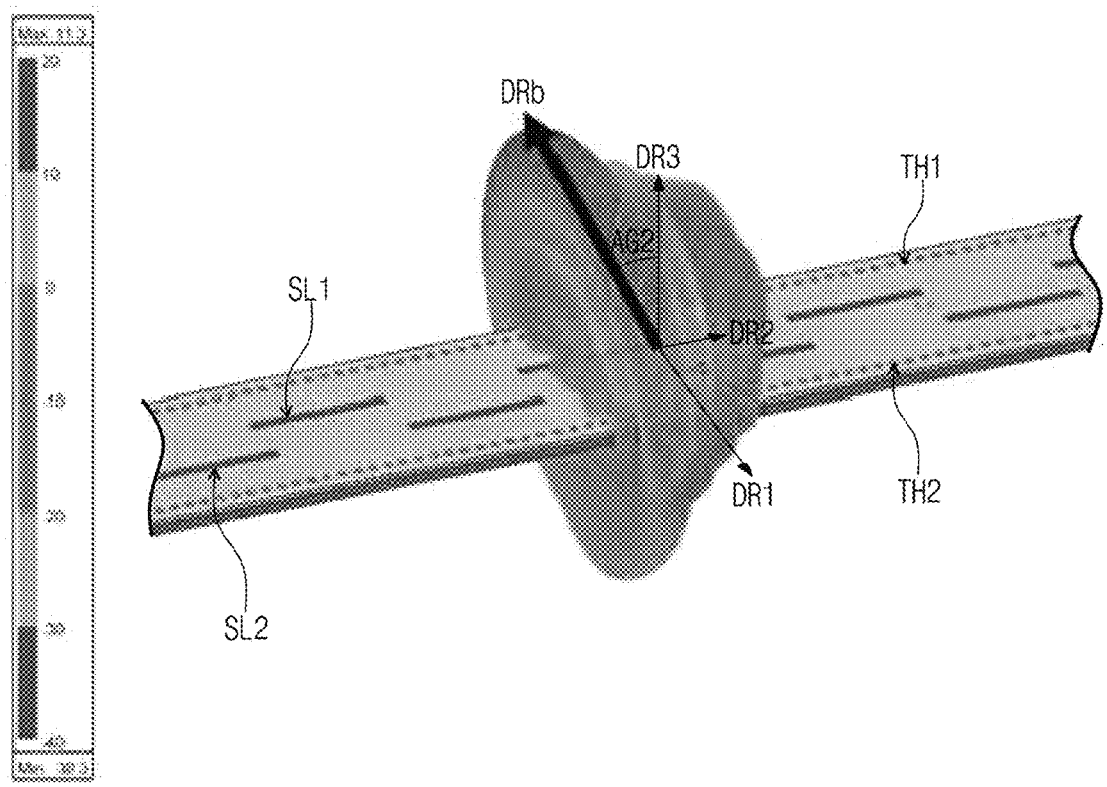
Figure 10C:
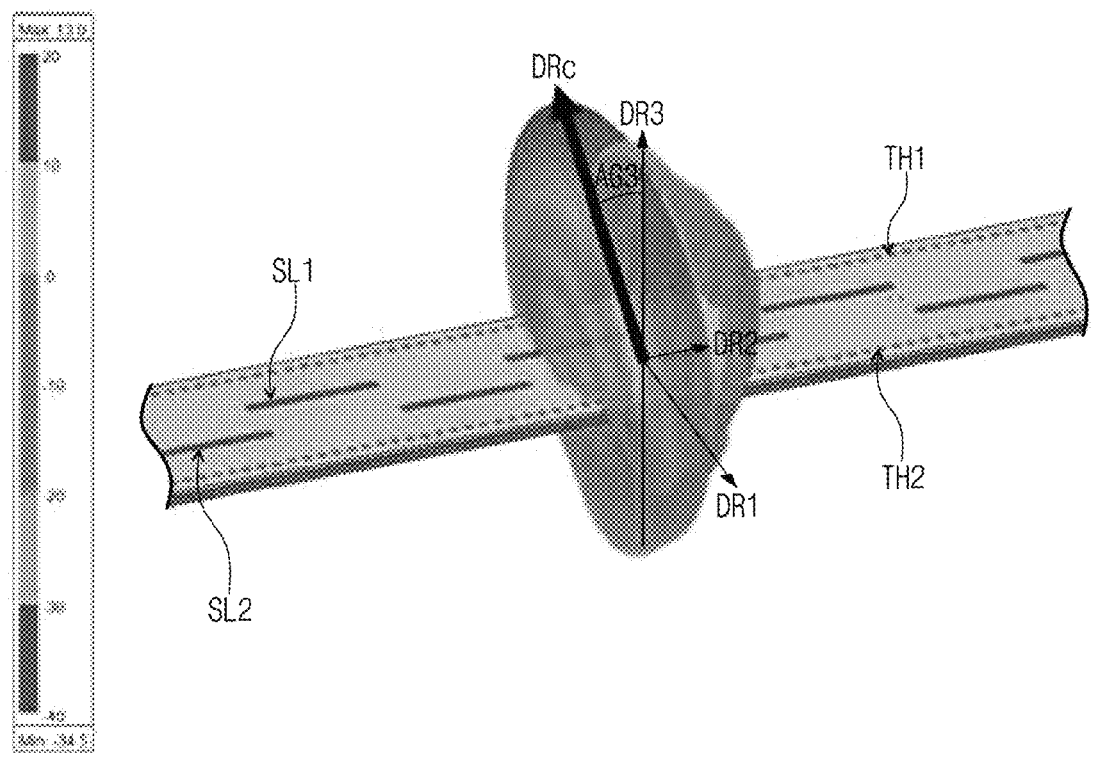

FIG. 9 is a view illustrating the radiation pattern of an antenna according to an embodiment of the present disclosure, and FIGS. 10A, 10B, and 10C are views illustrating the radiation pattern of an antenna by frequency according to an embodiment of the present disclosure.

FIG. 9 may be the radiation pattern of a cross-section of the antenna ANT taken along the first direction DR1. In FIG. 9, 90° may refer to the first direction DR1. FIG. 10A illustrates the radiation pattern of the antenna ANT at 25 GHz. FIG. 10B illustrates the radiation pattern of the antenna ANT at 27 GHz. FIG. 10C illustrates the radiation pattern of the antenna ANT at 29 GHz.

In FIGS. 10A, 10B, and 10C, the gain of an antenna is illustrated using colors. For example, red may illustrate an antenna gain of about 0 dB to about 10 dB, yellow may illustrate an antenna gain of about −10 dB to about 0 dB, light green may illustrate an antenna gain of about −20 dB to about −10 dB, green may illustrate an antenna gain of about −30 dB to about −20 dB, cyan may illustrate an antenna gain of −40 dB to about −30 dB, and blue may illustrate an antenna gain of about −50 dB to about −40 dB.

When an antenna gain is greater than or equal to about 0 dB in a radiation pattern, it can be said that a signal is radiated in a corresponding direction. In the direction, 0° may refer to the third direction DR3.

Referring to FIGS. 6, 9, and 10A, a first graph GP1 illustrates the radiation pattern of the antenna ANT at a first frequency. The first frequency may be about 25 GHz (gigahertz).

The antenna ANT may be designed to operate at the first frequency. The antenna ANT may transmit, receive, or transmit/receive a signal having the first frequency.

A beam may be tilted by a first angle AG1 at the first frequency. The first angle AG1 may be about −35°. The antenna ANT may be said to have directivity in a first radiation direction DRa at the first frequency. The antenna ANT may have an antenna gain of about 8.1 dB in the first radiation direction DRa at the first frequency.

Referring to FIGS. 6, 9, and 10B, a second graph GP2 illustrates the radiation pattern of the antenna ANT at a second frequency. The second frequency may be about 27 GHz.

The antenna ANT may be designed to operate at the second frequency. The antenna ANT may transmit, receive, or transmit/receive a signal having the second frequency.

A beam may be tilted by a second angle AG2 at the second frequency. The second angle AG2 may be about −23°. The antenna ANT may be said to have directivity in a second radiation direction DRb. The antenna ANT may have an antenna gain of about 11.3 dB in the second radiation direction DRb at the second frequency.

Referring to FIGS. 6, 9, and 10C, a third graph GP3 illustrates the radiation pattern of the antenna ANT at a third frequency. The third frequency may be about 29 GHz.

The antenna ANT may be designed to operate at the third frequency. The antenna ANT may transmit, receive, or transmit/receive a signal having the third frequency.

A beam may be tilted by a third angle AG3 at the third frequency. The third angle AG3 may be about −14°. The antenna ANT may be said to have directivity in a third direction radiation direction DRc. The antenna ANT may have an antenna gain of about 13.0 dB in the third radiation direction DRc at the third frequency.

In the case of a super high frequency (SHF) or an extremely high frequency (EHF) having a high frequency band, the loss of a signal may be large depending on a transmission distance. However, according to the present disclosure, the antenna ANT may radiate a signal in the third direction DR3 in the frequency band BW. The antenna ANT may be said to have directivity in the third direction DR3 in the frequency band BW. The antenna ANT may improve the concentration of an antenna gain. Accordingly, the electronic device DD (see FIG. 1) with improved transmission distance of a signal may be provided.

In addition, according to the present disclosure, the frequency band BW operating in the antenna ANT may be broadband. Accordingly, the electronic device DD (see FIG. 1) with improved frequency bandwidth may be provided.

Figure 11:
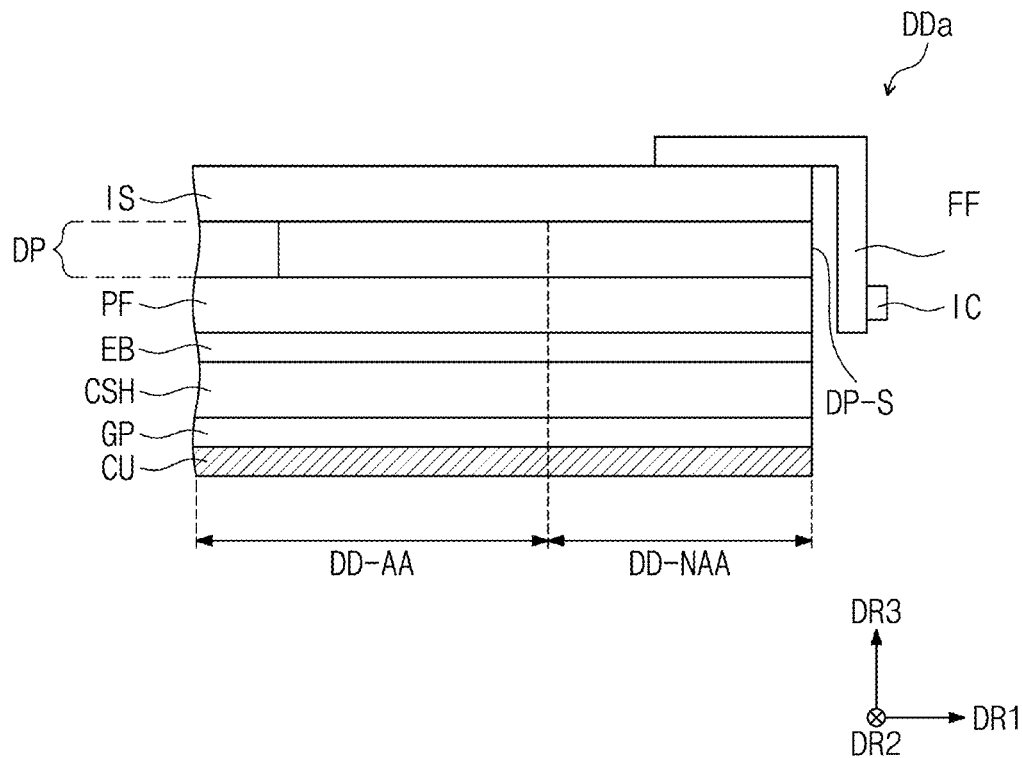
FIG. 11 is a cross-sectional view of an electronic device according to an embodiment of the present disclosure.
Figure 12:
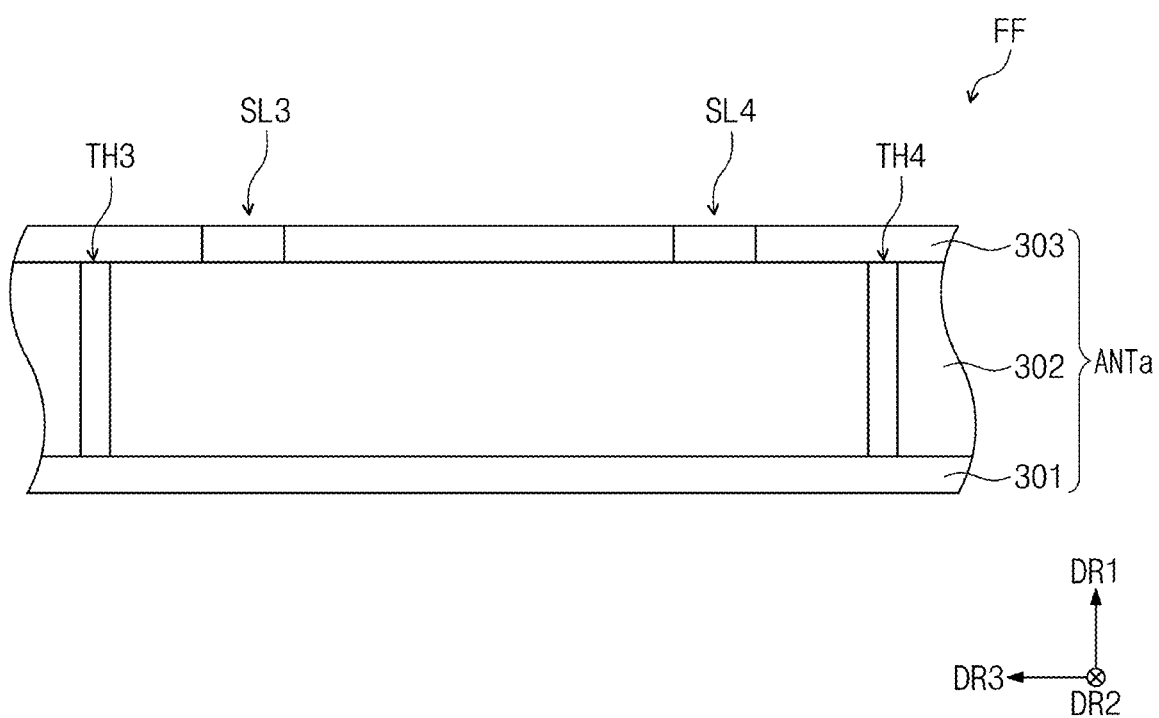
FIG. 12 is a cross-sectional view of a flexible circuit film according to an embodiment of the present disclosure.

FIG. 11 is a cross-sectional view of an electronic device according to an embodiment of the present disclosure, and FIG. 12 is a cross-sectional view of a flexible circuit film according to an embodiment of the present disclosure. In describing FIG. 11, the same reference numerals are given to the components described with reference to FIG. 2, and the descriptions thereof are omitted.

Referring to FIG. 11 and FIG. 12, an electronic device DDa may include an active region DD-AA and a peripheral region DD-NAA adjacent to the active region DD-AA.

The electronic device DDa may further include a flexible circuit film FF.

The flexible circuit film FF may be disposed in the peripheral region DD-NAA. The flexible circuit film FF may be electrically connected to a sensor layer IS. The flexible circuit film FF may be bent, and thus, face a side surface DP-S of a display layer DP. On the flexible circuit film FF, a driving chip IC may be mounted. The flexible circuit film FF may transmit a signal generated in the driving chip IC to an antenna ANT.

The driving chip IC may provide a signal to the antenna ANT through the first port PO1 (see FIG. 4A) and the second port PO2 (see FIG. 4A). The driving chip IC may control the operation of the antenna ANT. For example, the driving chip IC may adjust power supplied to each of a plurality of antennas ANT to adjust beam steering of the antenna ANT, and may focus a frequency signal in a specific direction to improve energy. In addition, a desired radiation pattern may be formed to improve radiation efficiency. In an embodiment of the present disclosure, the driving chip IC may be referred to as a beam forming chip IC.

The flexible circuit film FF may be composed of a substrate integrated waveguide. The flexible circuit film FF may include a first metal layer 301, a dielectric layer 302, and a second metal layer 303.

The first metal layer 301 may include a conductive material. For example, the first metal layer 301 may include copper (Cu). The thickness of the first metal layer 301 may be about 15 um to about 20 um. For example, the thickness of the first metal layer 301 may be about 18 um.

The dielectric layer 302 may be disposed on the first metal layer 301. The thickness of the dielectric layer 302 may be about 40 um to about 60 um. For example, the thickness of the dielectric layer 302 may be about 50 um. A plurality of second through-holes TH3 and TH4 may be defined in the dielectric layer 302.

The second metal layer 303 may be disposed on the dielectric layer 302. The second metal layer 303 may include a conductive material. For example, the second metal layer 303 may include copper (Cu). The thickness of the second metal layer 303 may be about 15 um to about 20 um. For example, the thickness of the second metal layer 303 may be about 18 um.

A plurality of auxiliary slots SL3 and SL4 may be defined in the second metal layer 303. The plurality of auxiliary slots SL3 and SL4 may be arranged in a zig-zag shape along the second direction DR2.

When viewed on a side surface, the plurality of second through-holes TH3 and TH4 may be spaced apart from each other with the plurality of auxiliary slots SL3 and SL4 interposed therebetween.

Figure 13:
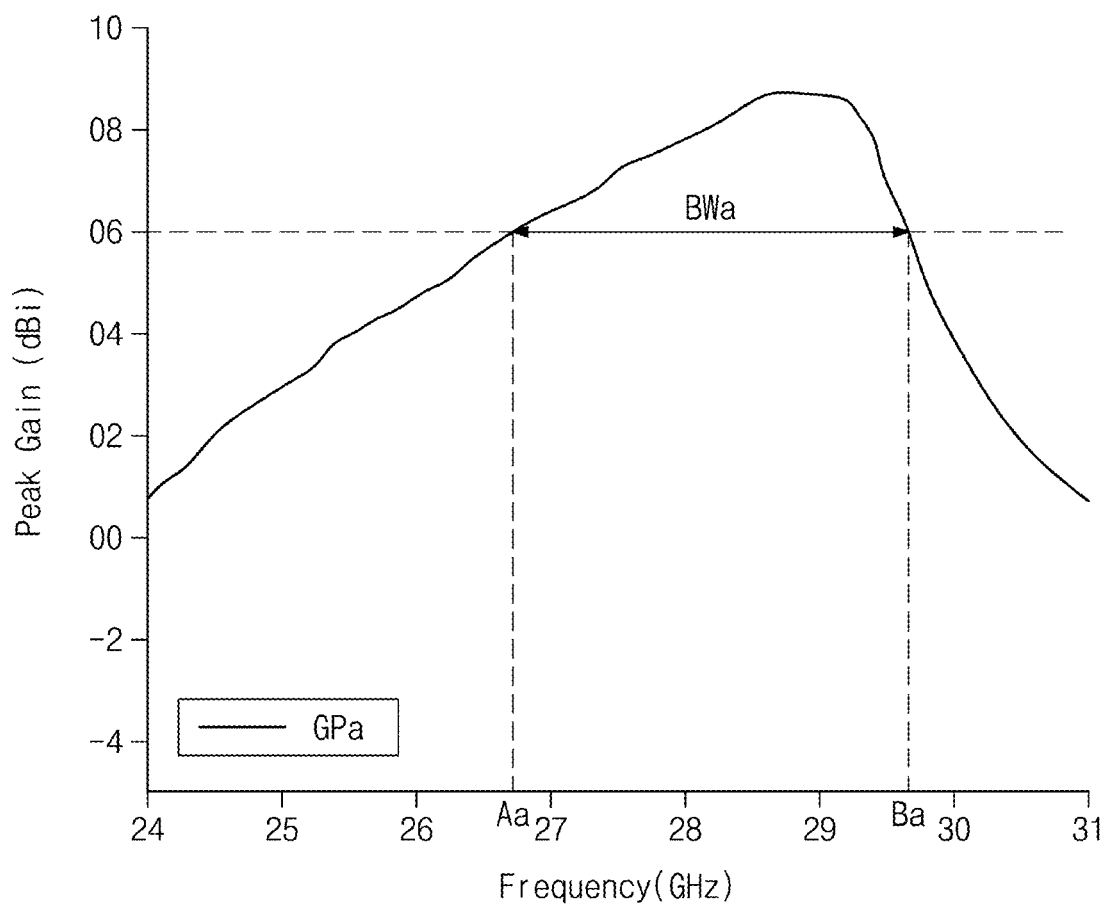
FIG. 13 is a graph illustrating the total gain in accordance with frequencies of antennas according to an embodiment of the present disclosure.
Figure 14:
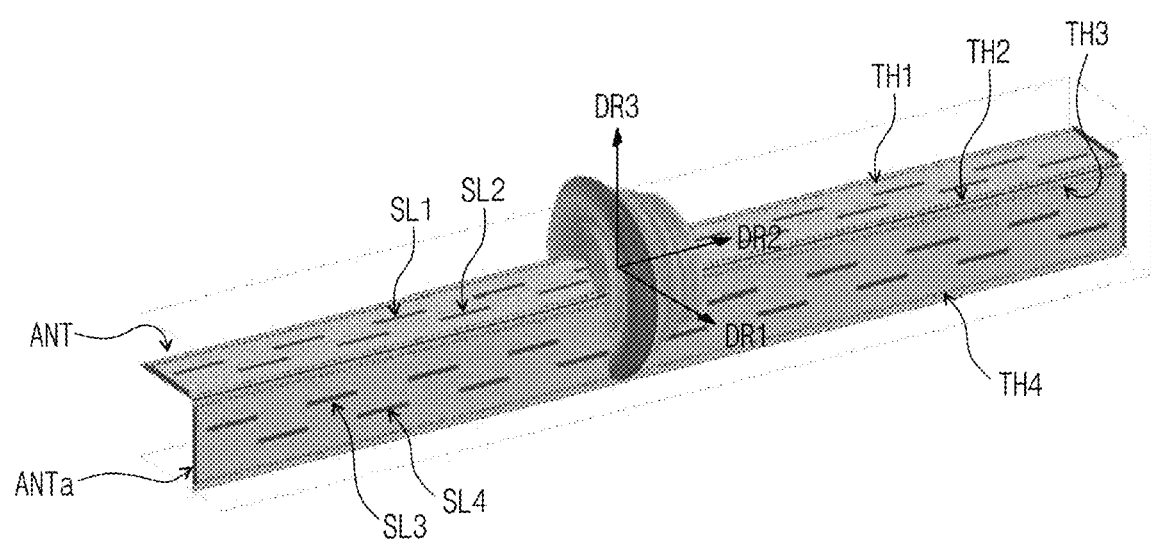
FIG. 14 is a view illustrating the radiation pattern of an antenna according to an embodiment of the present disclosure.

FIG. 13 is a graph illustrating the total gain in accordance with frequencies of antennas according to an embodiment of the present disclosure, and FIG. 14 is a view illustrating the radiation pattern of an antenna according to an embodiment of the present disclosure.

Referring to FIG. 13 and FIG. 14, antennas may include the antenna ANT and an auxiliary antenna ANTa of the flexible circuit film FF (see FIG. 12).

Referring to a graph GPa, the antennas ANT and ANTa may be designed to transmit, receive, or transmit/receive a signal having a frequency band BWa.

The antennas ANT and ANTa may operate between Aa and Ba. Aa may be about 26.7 GHz. Ba may be about 29.8 GHz. The antennas ANT and ANTa may operate in the frequency band BWa. The frequency band BWa may be about 2.1 GHz, and the maximum radiant gain at this time may be about 6 dB or greater.

The antenna ANT may radiate a signal in the third direction DR3 in the frequency band BWa. The auxiliary antenna ANTa may radiate a signal in the first direction DR1 in the frequency band BWa.

According to the present disclosure, the antennas ANT and ANTa may include the antenna ANT configured to radiate a signal in the third direction DR3 and the auxiliary antenna ANTa configured to radiate a signal in the first direction DR1.

According to the present disclosure, the antennas ANT and ANTa may be said to have directivity in the third direction DR3 and in the first direction DR1 in a frequency band BW. The antenna ANT may improve the concentration of an antenna gain. Accordingly, the electronic device DD (see FIG. 1) with improved transmission distance of a signal may be provided.

In addition, according to the present disclosure, the frequency band BWa operating in the antennas ANT and ANTa may be broadband. Accordingly, the electronic device DD (see FIG. 1) with improved frequency bandwidth may be provided.

According to the description above, a plurality of first slots defined in a plurality of sensing electrodes may be operated as a slot antenna. An antenna may radiate a signal in a third direction in a frequency band. The antenna may be said to have directivity in the third direction in the frequency band. The antenna may improve the concentration of an antenna gain. Accordingly, an electronic device with improved signal transmission performance may be provided.

Although the present disclosure has been described with reference to preferred embodiments of the present disclosure, it will be understood by those skilled in the art that various modifications and changes in form and details may be made therein without departing from the spirit and scope of the present disclosure as set forth in the following claims. Accordingly, the technical scope of the present disclosure is not intended to be limited to the contents set forth in the detailed description of the specification, but is intended to be defined by the appended claims.

What is claimed is:

1. An electronic device comprising:
   a display layer on which an active region and a peripheral region adjacent to the active region are defined, and which includes a base layer;
   a sensor layer disposed on the display layer, including a plurality of sensing electrodes, and having a plurality of first slots defined in the sensor layer; and
   a lower member layer disposed below the display layer,
   wherein a plurality of first through-holes are defined in the base layer and the lower member layer, and
   wherein, when viewed on a plane, the plurality of first through-holes are spaced apart from each other with respect to the plurality of first slots interposed therebetween.

2. The electronic device of claim 1, wherein, when viewed on the plane, the plurality of first through-holes and the plurality of first slots overlap the active region.

3. The electronic device of claim 1, wherein a metal is disposed along a side surface of each of the plurality of first through-holes.

4. The electronic device of claim 1, further comprising a cover layer disposed below the lower member layer, and having electrical conductivity.

5. The electronic device of claim 4, wherein, when viewed on the plane, the cover layer overlaps at least some of the plurality of first through-holes and at least some of the plurality of first slots.

6. The electronic device of claim 1, wherein the display layer further includes a common electrode disposed on the base layer, and
   wherein a plurality of second slots respectively overlapping the plurality of first slots are defined in the common electrode.

7. The electronic device of claim 1, wherein, when viewed on the plane, the plurality of first through-holes overlap the plurality of sensing electrodes.

8. The electronic device of claim 1, wherein, when viewed on the plane, the plurality of first through-holes do not overlap the plurality of sensing electrodes.

9. The electronic device of claim 1, wherein the display layer further includes a flexible circuit film disposed in the peripheral region.

10. The electronic device of claim 9, wherein the flexible circuit film faces a side surface of the display layer.

11. The electronic device of claim 9, wherein the flexible circuit film includes a first metal layer, a dielectric layer disposed on the first metal layer, and a second metal layer disposed on the dielectric layer, and
    wherein a plurality of second through-holes are defined in the dielectric layer.

12. The electronic device of claim 11, wherein a plurality of auxiliary slots are defined in the second metal layer, wherein, when viewed on a side surface, the plurality of second through-holes are spaced apart from each other with respect to the plurality of auxiliary slots interposed therebetween.

13. The electronic device of claim 1, wherein the plurality of first slots include a plurality of first row slots arranged in a first direction and a plurality of second row slots spaced apart from the plurality of first row slots in a second direction crossing the first direction, and arranged in the first direction.

14. The electronic device of claim 1, wherein the lower member layer includes:
    a protective layer disposed below the base layer; and a heat dissipation sheet disposed below the protective layer.

15. The electronic device of claim 1, wherein the plurality of first slots are defined in a same layer as a layer on which the plurality of sensing electrodes are disposed.

16. An electronic device comprising:
a display layer on which an active region and a peripheral region adjacent to the active region are defined, and which includes a base layer;
a sensor layer disposed on the display layer, and including a plurality of sensing electrodes in which a plurality of first slots are defined;
a lower member layer disposed below the display layer; and
a cover layer disposed below the lower member layer, and having electrical conductivity,
wherein a plurality of first through-holes, each of which is integrally penetrated, are defined in the base layer and the lower member layer,
wherein, when viewed on a plane, the plurality of first slots are disposed between the plurality of first through-holes, and
wherein, when viewed on the plane, the plurality of first slots and the plurality of first through-holes overlap the cover layer.

17. The electronic device of claim 16, wherein, when viewed on the plane, the plurality of first through-holes and the plurality of first slots overlap the active region.

18. The electronic device of claim 16, wherein a metal is coated along a surface of each of the plurality of first through-holes.

19. The electronic device of claim 16, wherein the display layer further includes a common electrode disposed on the base layer, and
wherein a plurality of second slots respectively overlapping the plurality of first slots are defined in the common electrode.

20. The electronic device of claim 16, wherein the plurality of first slots include a plurality of first row slots arranged in a first direction and a plurality of second row slots spaced apart from the plurality of first row slots in a second direction crossing the first direction, and arranged in the first direction.

* * * * *